(12) United States Patent
Grendahl

(10) Patent No.: US 11,314,780 B2
(45) Date of Patent: Apr. 26, 2022

(54) AUDIT LOGGING AND CHRONOLOGIZING TOOL

(71) Applicant: Built Data LLC, Edina, MN (US)

(72) Inventor: Brett Grendahl, Edina, MN (US)

(73) Assignee: Built Data LLC, Edina, MN (US)

( * ) Notice: Subject to any disclaimer, the term of this patent is extended or adjusted under 35 U.S.C. 154(b) by 14 days.

(21) Appl. No.: 16/661,624

(22) Filed: Oct. 23, 2019

(65) Prior Publication Data

US 2020/0233883 A1 Jul. 23, 2020

Related U.S. Application Data

(60) Provisional application No. 62/751,110, filed on Oct. 26, 2018.

(51) Int. Cl.
| | |
|---|---|
| *G06F 16/28* | (2019.01) |
| *G06F 16/907* | (2019.01) |
| *G06F 16/22* | (2019.01) |
| *G06F 16/17* | (2019.01) |

(52) U.S. Cl.
CPC ........ *G06F 16/283* (2019.01); *G06F 16/1734* (2019.01); *G06F 16/22* (2019.01); *G06F 16/285* (2019.01); *G06F 16/907* (2019.01)

(58) Field of Classification Search
CPC ...... G06F 16/283; G06F 16/907; G06F 16/22; G06F 16/285; G06F 16/1734; G06F 16/2465; G06F 16/248; G06F 16/93; G06Q 50/08
USPC ........................................................ 707/600
See application file for complete search history.

(56) References Cited

U.S. PATENT DOCUMENTS

2017/0046799 A1* 2/2017 Chan .................. G06Q 20/102
2018/0174250 A1* 6/2018 Faulkner ............. G06F 3/04842

\* cited by examiner

*Primary Examiner* — Evan Aspinwall
(74) *Attorney, Agent, or Firm* — Schwegman Lundberg & Woessner, P.A.

(57) ABSTRACT

An automated audit logger for producing a hyperindex visual chronicle of a construction project may include a receiver for receiving a data package including a sensor reading of a portion of a construction site relevant to a construction trade and a set of corresponding sensor metadata. The automated audit logger may also include an audit event creator for storing the sensor reading in an audit event entry of a data warehouse and a linking tool for updating a multi-faceted index of the data warehouse to link one or more members of the set of sensor metadata and a set of audit metadata to the audit event entry. The automated audit logger may also include an interface generator for constructing a user interface for displaying controlled subsets of the audit event entries and for serving the user interface to a user.

20 Claims, 23 Drawing Sheets

Grendahl Mechanical

Harvest History

Harvest + Action

Need An Answer?

*Our SPEED starts with the harvest!*

Harvest Sent

Harvest Success!

AUDIT LOGGING AND CHRONOLOGIZING TOOL

CROSS-REFERENCE TO RELATED APPLICATIONS

The present application claims priority to U.S. Provisional Patent Application No. 62/751,110 entitled Knowledge Management System and filed on Oct. 26, 2018, the content of which is hereby incorporated by reference herein in its entirety.

TECHNOLOGICAL FIELD

The present application relates to an automated audit logging tool for the construction industry. More particularly, the present application relates to a device for visually tracking, communicating about, and chronologizing onsite activities at a construction project. Still more particularly, the present application relates to a device for visually capturing construction activities and producing a real-time communication platform related to the activities, while simultaneously constructing a hyperindex visual chronicle of the construction project.

BACKGROUND

The background description provided herein is intended to generally present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The construction industry suffers from a multitude of inefficiencies and lost-information issues stemming from a variety of factors. First, design of construction projects commonly involves the coming together of several design teams, each having a particular discipline. Second, the construction of the project commonly involves multiple trades, each having a particular expertise, working, often simultaneously, on site to build the project. Third, the project is commonly a one-off creation where the order, timing, and success of each operation may not be very predictable. As such, comparisons between a construction project and an assembly line are very few and far between.

Adding to the inefficiencies are that awareness and communication are both hindered. That is, unlike a manufacturing process where assembly may be performed in a nearby or attached facility and in a controlled environment, project/construction managers on a construction project may be located away from the construction site and not have the ability to continually oversee the construction process. Still further, the broad expanse and often compartmentalized nature of construction can make it difficult to observe or see many aspects of a project all at once even when present and on site. A further hinderance to awareness and communication is that construction is a hands-on activity. The tradesman performing the work often struggle to keep lists, prioritize, communicate, and/or manage their activities when compared to someone that has a computer, a phone, e-mail, a calendar, and a task list continually at their fingertips.

Finally, with respect to lost information, accurately understanding the activities, and the timing of those activities, that occurred to construct a project is commonly lost as construction progresses. That is, while a visit to a facility may reveal whether something was installed or constructed, the timing of that installation or construction and, in particular, the timing relative to other aspects of the project may be completely lost. Still further, without a visit to the project site, the actual as-built condition may not be recorded or verified in any location. Even today, when as-built drawings are requested by an owner, such drawings may include the original construction documents together with any changes that were brought to the attention of the design team, but other unreported changes may be lost. Still further, as-built drawings fail to capture the timing of the events and/or any dialogue, visual aids, or other context surrounding the activities and, as such, fail to capture how things were constructed or why particular aspects of a project were constructed in a particular way. While e-mails and/or letters may exist, they may be kept or stored in disassociation with project visuals and other conversations and may also be insufficient to portray how portions of a building were built or why they were built in a particular way.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a method for an automated construction site visual audit log may include receiving a data package originating at a device at a construction site of a construction project. The data package may include a sensor reading of a portion of a construction site relevant to a construction trade. The sensor reading may be generated by a sensor that is part of a device manipulated by a person performing construction tasks pursuant to the construction trade at the construction site. The sensor may measure photons to produce the sensor reading and the sensor reading may represent a construction audit event at the construction site that is relevant to a construction team for ongoing tracking, managing, or chronologizing of the construction project. The data package may also include a set of sensor metadata that corresponds to the sensor reading. For example, the set of sensor metadata may include a sensor type, metrics of the sensor when the sensor reading was captured, a time the sensor reading was captured, a geographic location the sensor reading was captured, an orientation of the sensor when the sensor reading was captured, and/or a field-of-view of the sensor when the sensor reading was captured. The set of sensor metadata may also include an identity of the person, an identity of an entity with responsibility for the sensor, an identity of the construction site, a dialogue providing project relevant context to the construction audit event, a label identifying the sensor reading as being part of a particular category, identifications of other persons on the construction project and/or a key identifying another sensor reading. The method may also include storing the sensor reading in an audit event entry of a data warehouse and updating a multi-faceted index of the data warehouse. The updating may function to link one or more members of the set of sensor metadata to the audit event entry and may also link one or more members of a set of audit metadata to the audit event entry. The audit metadata may include a sensor type, metrics of the sensor when the sensor reading was captured, a time the sensor reading was received, a geographic location the sensor reading was captured, an orientation of the sensor when the sensor reading was captured, and/or a field-of-view of the sensor when the sensor reading was captured. The audit metadata may also include an identity of the person, an identity of an entity with responsibility for the sensor, an identity of the construction site, a classification of an item discernable from the sensor reading or the sensor metadata, the construction project to which at least one of the person, the sensor, or the construction site is attached, identifications of other persons on the construction project, and/or a key identifying another sensor reading. The method may also include constructing a user interface for construction audit events, including the audit event entry, in the data warehouse. The user interface may include a visual representation of sensor readings organized by the multifaceted index. The user interface may also include user interface elements for one or more facet controls to accept user input to select the inclusion, order, or magnitude of facets to modify the visual representation of sensor readings. The modification of the visual representation of sensor readings may be performed by sorting a series of audit event entries corresponding to the construction audit events through the multi-faceted index using the user input. The method may also include serving the user interface to a user enabling the user to visually experience the construction audit events.

In one or more additional or alternative embodiments, a computer readable storage medium may be provided having instructions store thereon when operated by processor perform a method for an automated construction site visual audit log. The method may include, receiving a data package originating at a device at a construction site of a construction project. The data package may include a sensor reading of a portion of a construction site relevant to a construction trade. The sensor reading may be generated by a sensor that is part of a device manipulated by a person performing construction tasks pursuant to the construction trade at the construction site. The sensor may measure photons to produce the sensor reading and the sensor reading may represent a construction audit event at the construction site that is relevant to a construction team for ongoing tracking, managing, or chronologizing of the construction project. The data package may also include a set of sensor metadata that corresponds to the sensor reading. For example, the set of sensor metadata may include a sensor type, metrics of the sensor when the sensor reading was captured, a time the sensor reading was captured, a geographic location the sensor reading was captured, an orientation of the sensor when the sensor reading was captured, and/or a field-of-view of the sensor when the sensor reading was captured. The set of sensor metadata may also include an identity of the person, an identity of an entity with responsibility for the sensor, an identity of the construction site, a dialogue providing project relevant context to the construction audit event, a label identifying the sensor reading as being part of a particular category, identifications of other persons on the construction project and/or a key identifying another sensor reading. The method may also include storing the sensor reading in an audit event entry of a data warehouse and updating a multi-faceted index of the data warehouse. The updating may function to link one or more members of the set of sensor metadata to the audit event entry and may also link one or more members of a set of audit metadata to the audit event entry. The audit metadata may include a sensor type, metrics of the sensor when the sensor reading was captured, a time the sensor reading was received, a geographic location the sensor reading was captured, an orientation of the sensor when the sensor reading was captured, and/or a field-of-view of the sensor when the sensor reading was captured. The audit metadata may also include an identity of the person, an identity of an entity with responsibility for the sensor, an identity of the construction site, a classification of an item discernable from the sensor reading or the sensor metadata, the construction project to which at least one of the person, the sensor, or the construction site is attached, identifications of other persons on the construction project, and/or a key identifying another sensor reading. The method may also include constructing a user interface for construction audit events, including the audit event entry, in the data warehouse. The user interface may include a visual representation of sensor readings organized by the multifaceted index. The user interface may also include user interface elements for one or more facet controls to accept user input to select the inclusion, order, or magnitude of facets to modify the visual representation of sensor readings. The modification of the visual representation of sensor readings may be performed by sorting a series of audit event entries corresponding to the construction audit events through the multi-faceted index using the user input. The method may also include serving the user interface to a user enabling the user to visually experience the construction audit events.

While multiple embodiments are disclosed, still other embodiments of the present disclosure will become apparent to those skilled in the art from the following detailed description, which shows and describes illustrative embodiments of the present disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present application, in one or more embodiments, includes a device adapted for receiving sensor data from a construction site to actively capture construction site activities on an ongoing basis. The device may augment the sensor data to more accurately capture the construction activities and make the sensor data more suitable for immediate action, a long-term chronology, or both. In either case, the device may create entries for the sensor data in multi-faceted fashion making the entries accessible based on a wide range of later investigation avenues. The sensor data may be visual data and may be suitable for presentation in a real time feed during the construction process and for storage as a visual entry in a hyperindex visual chronicle of the project.

The present device may solve a litany of the efficiency, communication, and lost information issues mentioned above. The system may frequently and visually capture the activities being performed on a construction site. The visual capture may be augmented by sophisticated time, spatial, and contextual data allowing the activities of a construction project and their context to be chronologized into a hyperindex visual chronicle. The computerized chronicle may be provided to owners for purposes of as-built issues, investigations, construction defects, future planning and the like. Moreover, and on a more immediate basis, the device may facilitate real-time communication and decision making based on the active and ongoing acquisition of visual and sophisticated data. In particular, the device may facilitate project management by providing ongoing visual updates to project tasks allowing trailing tasks or projects to be kicked off without delay. The device may also facilitate faster problem solving. For example, the device may short-circuit the request for information (RFI) process and immediately provide captured visuals to the respective design professional needing to make a decision regarding a constructability problem or other issue. The device may, thus, provide a dual functionality of a) streamlining communication with its visual communication tools and b) creating a hyperindex visual chronicle containing never before captured chronology that is both visual and easily searchable along multiple facets.

Figure 1:
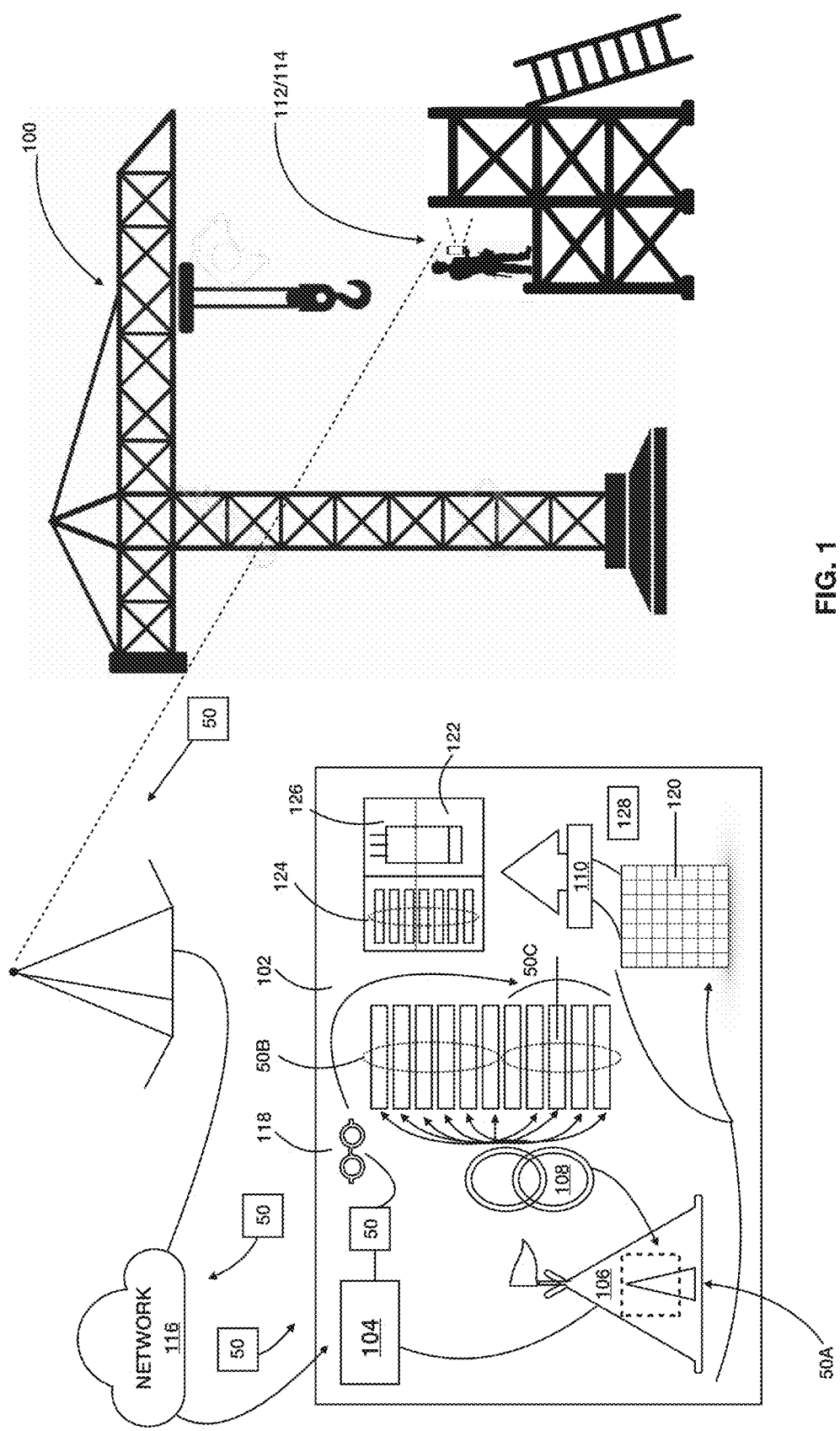
FIG. 1 is a diagram of a system including an audit logging and chronologizing tool, according to one or more embodiments.

Referring now to FIG. 1, a system 100 for visualization, communication, and chronologizing is shown. The system may be configured to capture visual representations and related information from a construction project and feed that information to a construction and/or design team on a real-time basis. The system may also be configured to facilitate communication amongst the construction and/or design team members to facilitate ongoing progress on the project while also building a hyperindex visual chronicle of the construction project. As shown, the system may include an automated audit logging device 102 having a receiver 104, an audit event creator 106, a linking tool 108, and an interface generator 110. Still other features of the automated audit logger 102 may be provided and the logger may be used in conjunction with the system 100 including additional devices such as a sensor 112 and transmitter 114, for example.

As shown, the receiver 104 may be configured to receive a data package 50 originating at a construction site of a construction project. The receiver 104 may include one or a combination of a variety of receivers. In one or more embodiments, the receiver 104 may be a physical input module on a server or other computing device such as a hardwired or Wi-Fi connected port in communication with a network 116 such as the internet, for example. Internally, the port may be in communication with a software module operated by a processor on the computing device. The software module may be adapted to recognize inputs from a field sensor 112 and route the inputs to the audit event creator 106, for example.

For purposes of context, the data package 50 may include a sensor reading 50A from a sensor 112, located on a construction project, and corresponding metadata 50B. The sensor reading 50A may be generated by a sensor 112 that is part of a device manipulated by a person performing construction tasks pursuant to the construction trade at the construction site. For example, where the present system is used by a mechanical contractor, the sensor 112 may include a camera of a smartphone of a sheet metal fabricator that is onsite for duct work installation, or of a pipe fitter that is onsite for piping installation. As may be appreciated, construction tasks may not be limited to physical labor tasks, but can include project management, construction management, inspection, and other construction related tasks. As such, the persons performing construction tasks can include a wide variety of jobsite personnel, visitors, owners, and other persons appearing regularly, periodically, or even a single time on a jobsite of a construction project.

In one or more embodiments, the sensor 112 may be configured for measuring photons to produce the sensor reading 50A and the sensor reading 50A may represent a construction audit event at the construction site that is relevant to a construction team for ongoing tracking, managing, or chronologizing of the construction project. As suggested above, the sensor 112 may include a camera on a smartphone, for example. Alternatively, the sensor 112 may include another digital camera, a video camera, a surveillance camera, or other visual capture device. In still other embodiments, the sensor may be an audio capture device or other sensor, for example. In one or more embodiments, the sensor may include and/or incorporate a transmitter for transmitting the sensor reading to a relay tower, such as a mobile phone tower, or other relay system adapted to receive transmissions and communicate the transmissions to a network, 116, such as the internet. In one or more embodiments, the sensor 112 may be docked from time to time and an onsite docking station may upload the sensor readings to the network. In still other embodiments, local Bluetooth, Wi-Fi, or other shorter distances wireless communication technologies may be used to upload the sensor readings and transmit the readings to the network 116.

For further context, the corresponding metadata 50B may include a set of sensor metadata that corresponds to the sensor reading 50A. For example, the set of sensor metadata 50B may include a description of the type of sensor used to capture the reading. The set of sensor metadata 50B may also include metrics of the sensor when the sensor reading was captured, a time the sensor reading was captured, a geographic location the sensor reading was captured, an orientation of the sensor when the sensor reading was captured, and/or a field-of-view of the sensor when the sensor reading was captured. The set of sensor metadata 50B may also include an identity of the person facilitating the sensor reading capture and/or the person's role on the jobsite or with the entity managing the system, for example. The set of sensor metadata 50B may also include an identity of an entity with responsibility for the sensor such as the contractor the person works for, for example. The set of sensor metadata 50B may also include an identity of the construction site. Still other types of metadata may be included as part of the set of metadata.

For example, the set of sensor metadata 50B may also include a dialogue providing project relevant context to the construction audit event. This dialogue may include comments, questions, descriptive information, updates, or other input from the person with the sensor and capturing the sensor reading. The dialogue may be in the form of text, audio, or other input complimentary to the sensor reading. In one or more embodiments, the comments may describe what the sensor reading is, where it is on the construction project, or what aspect of the project the sensor reading relates to. For example, if the sensor reading is a photo of a mechanical unit on a project, the comments may state that installation of the mechanical unit is complete. As another example, if the sensor reading is a photo of a mechanical pipe approaching a structural component of the project, the comment may include a question of whether the structural component can be penetrated when the pipe is extended. In still other embodiments, the sensor reading may include a photo of an area on a jobsite where materials have been delivered. The comment, in this case, may include a statement about what the material is and where it is located such that efforts can be made to accommodate the stored material during other activities or to reschedule activities until the stored material is cleared out. Still other project related coordination comments, other questions about how to address particular issues on a project, or other project updates may be provided as dialogue metadata.

As another example of the types of information that may be included in the set of sensor metadata 50B, a label identifying the sensor reading as being part of a particular category may be provided. That is, and as mentioned above, the dialogue may include comments, questions, or statements about the sensor reading. In some cases, pre-defined labels may be available for assigning to the sensor reading. In one or more embodiments, the pre-defined label may include a chronologizing or history label, a performance or action label, or a question or query label. For example, where a sensor reading is captured because the person on the project has a question about how to do something or how to proceed, the person may include a question label as part of the set of metadata. In another example, where the sensor reading is captured as part of an update on progress and where further work may be conducted based on the progress, the person may include an action label as part of the set of metadata. In another example, where a particular task is left partially complete and further work is necessary to complete the task, the person may include an action label. In other situations, where no particular question is being asked and no particular action is desired, the person may include a history label as part of the set of metadata. Still other labels may be provided to allow for later sorting or searching based on the type of sensor reading being generated.

Still another example of the types of information that may be included in the set of sensor metadata 50B is identifications of other persons on the construction project. For example, where a particular sensor reading relates to persons other the person capturing the sensor reading, the person may include the identity of other persons as part of the set of metadata. In one or more embodiments, where a person capturing a sensor reading wants to notify another person as being needed or desired to finish a task, for example, the person may include the other person's name in the set of metadata such that the other person may be associated with the sensor reading. In other situations, where the sensor reading relates to a problem or question, the person capturing the sensor reading may include the identifications of other person on the construction team and/or the design team that the person believes can help address the problem or question. For example, as in the example above where a mechanical pipe is approaching a structural member and there is a question about whether the pipe run can penetrate the structural member, the person may include the identity of the structural engineer on the project as part of the set of metadata. Still other circumstances may arise and may cause the person to include identifications of other persons in the set of metadata.

Still another example of the types of information that may be included in the set of sensor metadata 50B is a key identifying another sensor reading. In this situation, the person capturing the sensor reading may be aware of may consider the currently captured sensor reading to be related to or relevant to other previously captured sensor readings and may want to create a relationship between the one or more sensor readings. This may occur where the onsite person is capturing multiple sensor readings to help explain or depict a particular situation. This may also occur where an earlier sensor reading was captured and the present sensor reading is being captured to provide an update relating to the previous sensor reading. To create the desired relationship between the sensor readings, the person may include a key identifying the one or more other sensor readings as part of the set of metadata of the current sensor reading. Still other types of metadata may be included as part of the set of metadata captured by the sensor and received by the audit logger.

In one or more embodiments, the sensor 112 may be part of a computing device (e.g., a smartphone) having software stored thereon for assisting in the capture of the sensor readings. For example, the computing device may execute software that, when operating: controls the sensor to capture the sensor reading, triggers the generation of the sensor metadata, creates the data package, and controls a transmitter to transmit the data package. In the case of a smartphone, the software may control a camera on the phone to capture the sensor reading. With respect to generating sensor metadata 50B, in one or more embodiments, several items of metadata 50B may be generated automatically by accessing available metadata on the computing device. That is, for example, the type of the device, the time, the geographical position or other data may be available on the device and may be captured automatically by the device to generate metadata associated with the sensor reading. Other types of metadata may be input by the user and the software may prompt the user for such input. The transmitting of the data package may be done by way of one or more wireless or wired means. In one embodiment, the data package 50 may be transmitted via a cellular or other mobile network and a cellular or mobile network may facilitate further transmission to the automated audit logger by transmission through a network 116 such as the internet, for example.

As mentioned, the audit logger may also include an audit event creator. That is, having received the data package 50 including the sensor reading and the set of sensor metadata 50B corresponding to the sensor reading 50A, the automated audit logger may store the data package. In particular, the audit event creator of the automated audit logger may store the sensor reading in an audit event entry of a data warehouse. The audit event creator may also include a linking tool to update a multi-faceted index of the data warehouse to link one or more members of the set of sensor metadata to the audit event entry. This particular linking effort with the mutli-faceted index may allow for fast and efficient searching of stored sensor readings based on any one or several of the types of metadata associated with the sensor readings.

Updating the multi-faceted index may also include using the linking tool to link one or more members of a set of audit metadata to the audit event entry. That is, while the set of sensor metadata 50B received as part of the data package may be linked, an additional set of metadata called audit metadata 50C may also be linked. The additional set of metadata (e.g., audit metadata) may be provided by an auditor 118, which may include a user of the system and/or an artificial intelligence engine configured for reviewing the sensor reading 50A and the set of sensor metadata 50B to supplement the set of sensor metadata 50B with audit metadata 50C. Accordingly, the set of audit metadata 50C may include many of the same types of metadata provided with the data package 50. That is, the auditor may supplement the metadata with audit metadata 50C to fill in gaps in the metadata and/or add additional information. The audit metadata 50C may include the sensor type or metrics of the sensor when the sensor reading was captured. The audit metadata 50C may also include a time the sensor reading was received, a geographic location the sensor reading was captured, an orientation of the sensor when the sensor reading was captured, and/or a field-of-view of the sensor when the sensor reading was captured. The audit metadata 50C may also include an identity of the person that facilitated capture of the sensor reading and/or an identity of an entity with responsibility for the sensor, such as the contractor the person works for. The audit metadata 50C may also include an identity of the construction site. Still other types of audit metadata 50C may be provided that are the same or different than the metadata received as part of the data package.

For example, a classification of an item discernable from the sensor reading or the sensor metadata may be provided as part of the audit metadata 50C. In one or more embodiments, an auditor 118 may review the data package including the sensor reading and the corresponding metadata and may provide a classification of the sensor reading. In one or more embodiments, the classification may include a keyword, phrase, or series of keywords that may help to find the sensor reading in the data warehouse at a later time. For example, if the sensor reading includes an image of the installation of a roof top unit, the classification may include the terms "rooftop unit," "RTU," "roof," and/or other related terms. Where the particular location or number of the roof top unit is known, such more particular description may be included in the classification. In one or more other embodiments, the classification may include the type of sensor reading and/or metadata that are in the data package. For example, and as described above with respect to labels, if the sensor reading relates to an action on a project or a question, the classification may include "action" or "question," as the case may be, to categorize the sensor reading as a particular type. Where the sensor reading is not related to an action or a question, "history" may be included as the classification. Still other classifications may be provided by the auditor and may linked in the data warehouse to the sensor reading and set of metadata originally received in the data package.

Another type of metadata that may be provided by the auditor 118 may include the construction project to which at least one of the person, the sensor, or the construction site is attached and/or identifications of other persons on the construction project. Still another type of metadata that may be provided by the auditor includes a key identifying another sensor reading. These elements of metadata may be provided by the auditor for the same, similar, or other reasons as compared to the reasons the person capturing the sensor reading may provide this information.

In one or more embodiments, a member of the set of audit metadata is generated by a machine learning engine. That is, for example, the auditor 118 may include a machine learning engine that reviews the sensor reading and/or the corresponding sensor metadata and generates a member or a set of audit metadata. The member or the set of audit metadata may be an inference based on a new set of sensor metadata and a plurality of stored sets of audit metadata. In some circumstances, user verification of the audit metadata may be provided and the auditor may produce an inference result of the machine learning engine and present the inference result to the user. For example, the machine learning engine may review a new data package with a sensor reading and a set of sensor metadata. Based on stored sets of audit metadata and associated sensor readings and sensor metadata, the machine learning engine may infer that particular results for members of audit metadata that may be appropriate for the new data package.

In one or more embodiments, the auditor 118 may compare the sensor reading or the sensor metadata to a policy ruleset to determine whether the sensor reading or the sensor metadata violates the policy ruleset. The auditor may store the sensor reading in the audit event entry of the data warehouse in response to a determination that the sensor reading or the sensor metadata does not violate the policy ruleset. For example, a particular system administrator may include a ruleset for controlling the type of sensor readings and the content of the metadata that are input into or generated by the system. For example, profanity in textual, image, or video formatted may violate a particular ruleset and may prevent an audit entry from being stored. Alternatively, an auditor may redact and/or adjust the sensor reading and/or the metadata to assist in complying with the ruleset thereby allowing the audit entry to be created.

The data warehouse with multi-faceted index may form a hyperindex visual chronicle 120 of the construction project. That is, the ongoing capture of sensor readings across and during a construction project may be successful in capturing a plethora of very valuable data. However, without more, this data is likely very unusable for determining the as-built condition of the building or facility, to investigate how something was constructed, to understand why something was constructed the way it was, or to otherwise gather an understanding of what went on during the construction process. However, and as has been described, the automated data logger may store the sensor readings 50A and the sensor metadata 50B/50C (e.g., both the sensor metadata and the audit metatdata) in a data warehouse and update the multi-faceted index of the data warehouse to link the metadata to the audit event entry. The audit logger, thus, creates a meaningful chronicle of the construction project that is useful in understanding the construction process as well as the details of the actual resulting facility that was constructed. The chronicle may be visual allowing for more fully appreciating the details of the project and may be hyperindexed allowing for convenient hyperlinked access to the audit event entries across a multi-faceted index. The hyperindex visual chronicle may, thus, fulfill a long-felt, but unsolved need relating to capturing actual as-built conditions of a construction project and may go further to capture how particular aspects of the facility were constructed and why particular aspects of the construction project were constructed in a particular way. The chronicle may, thus, establish a highly valuable deliverable and archival system for facility owners and the contractors and design team that constructed and/or designed the facilities.

As mentioned, the automated audit logger may also include an interface generator 110. The interface generator 110 may be configured for serving an interface to a user based on user inputs defining the type and arrangement of audit event entries they desire viewing. For example, the interface generator 110 may be configured to construct a user interface for construction audit events, including the audit event entry stored by the audit event creator, in the data warehouse. In particular, the interface generator may establish a user interface 122 including a visual representation of sensor readings organized by the multi-faceted index. The interface 122 may include user interface elements for one or more facet controls 124 to accept user input to select the inclusion, order, or magnitude of facets to modify the visual representation of sensor readings by sorting a series of audit event entries corresponding to the construction audit events through the multi-faceted index using the user input. That is, the interface 122 may include controls allowing input by a user to control the presentation of audit events. In one example, a control 124 may include one or more fields associated with a particular type of metadata stored in the data warehouse. For example, a control may include the name of a construction project and entry of a particular construction project may cause the interface to display all audit entries for that project. As another example, a control may include a name of a worker on a project and entry of a worker's name may cause the interface to display all of the audit entries captured by that worker. As another example, a control may include a classification or a keyword, or other type of metadata allowing for a more specific pulling from the data warehouse and resulting in a display of particular audit events relating to a particular subject matter, a specific problem, a specific topic, or a specific question. Still other type of controls and combinations of controls may be provided. The interface generator 110 may serve the user interface to a user enabling the user to visually experience the construction audit events.

In one or more embodiments, the interface generator 110 may also produce a real-time feed. For example, without user prompting or based on one or more inputs from the user, the interface generator 110 may display a visual representation of the sensor reading to provide a real-time feed. That is, for example, a user may provide no input and any and all sensor readings and/or corresponding metadata may be displayed to the user as the sensor readings are captured. In one or more embodiments, the user may input a construction project name and, in that case, any and all sensor readings captured on that project may be displayed to a user as the sensor readings are captured. The real time feed may be based on any one or multiple types of metadata allowing the feed to be customized to a user's liking and allowing real time viewing of sensor readings and metadata across multiple and/or combinations of characteristics of the sensor readings.

In one or more embodiments, the visual representation of the sensor reading may include a thumbnail image 126 and selection of the thumbnail image 126 may generate a detailed account of the sensor reading and the set of sensor metadata. That is, interface generator 110 may produce a thumbnail image of the sensor reading when presenting results from a controlled search and or in a real-time feed. Upon selection by the user of the thumbnail image, a more fully detailed visual representation of the sensor reading and the metadata associated with the sensor reading may be presented to the user allowing the user to review more information regarding the reading. In some cases, a limited amount or selected types of metadata may be presented along with the thumbnail image so as to streamline the review of the user.

In one or more embodiments, an aggregator 128 may be used to aggregate a plurality of audit entries. The aggregator 128 may be the same or similar to the controls that are part of the generation of the interface and may be adapted to capture a particular set of audit entries relating to a particular issue. The aggregator may be a particularly adapted portion of the interface generator, for example and may serve the plurality of audit entries to a plurality of persons and, in particular, the plurality of persons may include the parties involved in the creation of a problem and/or the parties involved in solving the problem or addressing the issue. In one or more embodiments aggregating the audit entries may be based on a common item of metadata across the plurality of audit entries such as a keyword or other classification, a label, a dialogue, or another type of metadata.

Figure 2A:
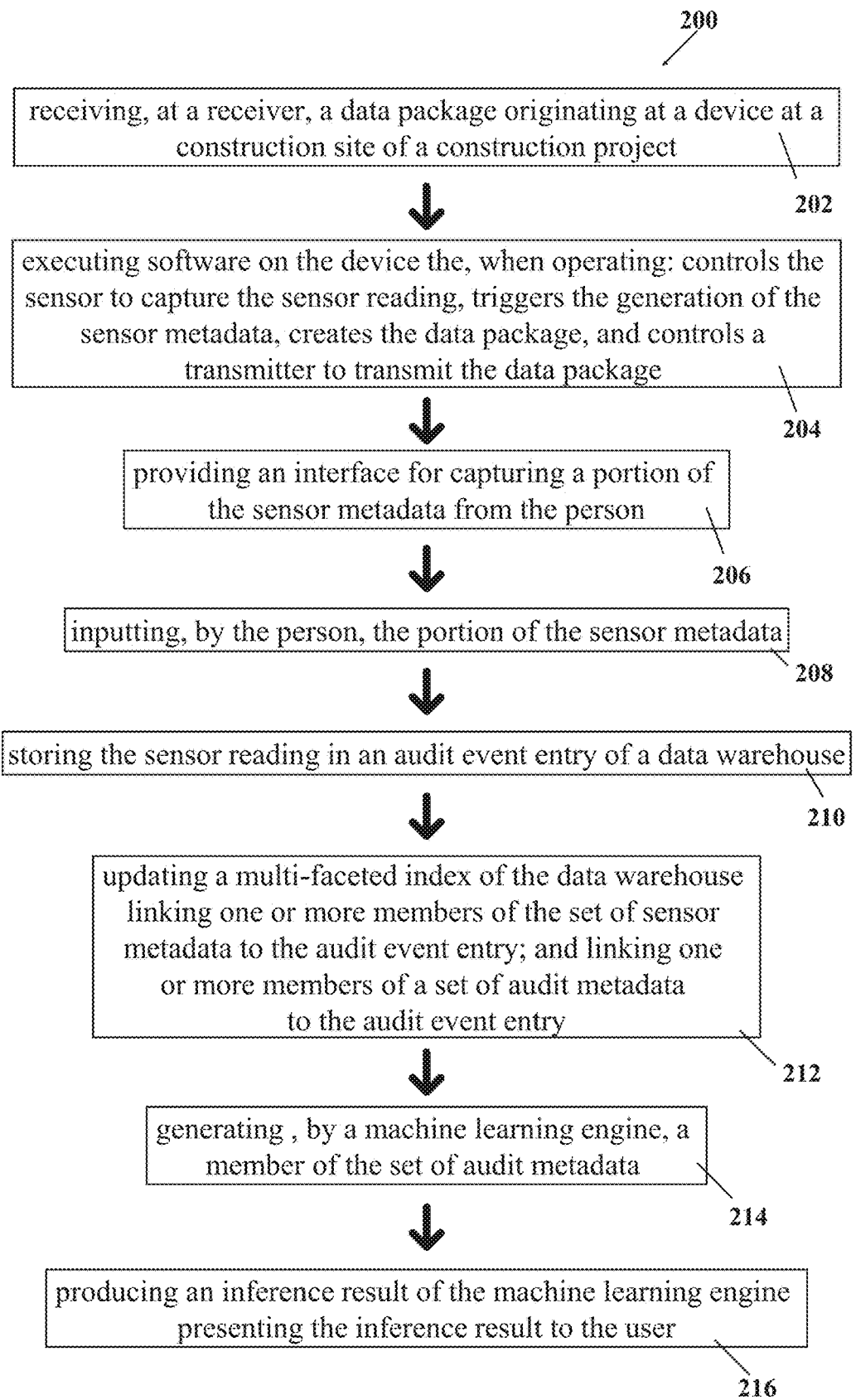
FIG. 2A is a chart depicting a portion of various operations involved in a method of an automated construction site visual audit log.
Figure 2B:
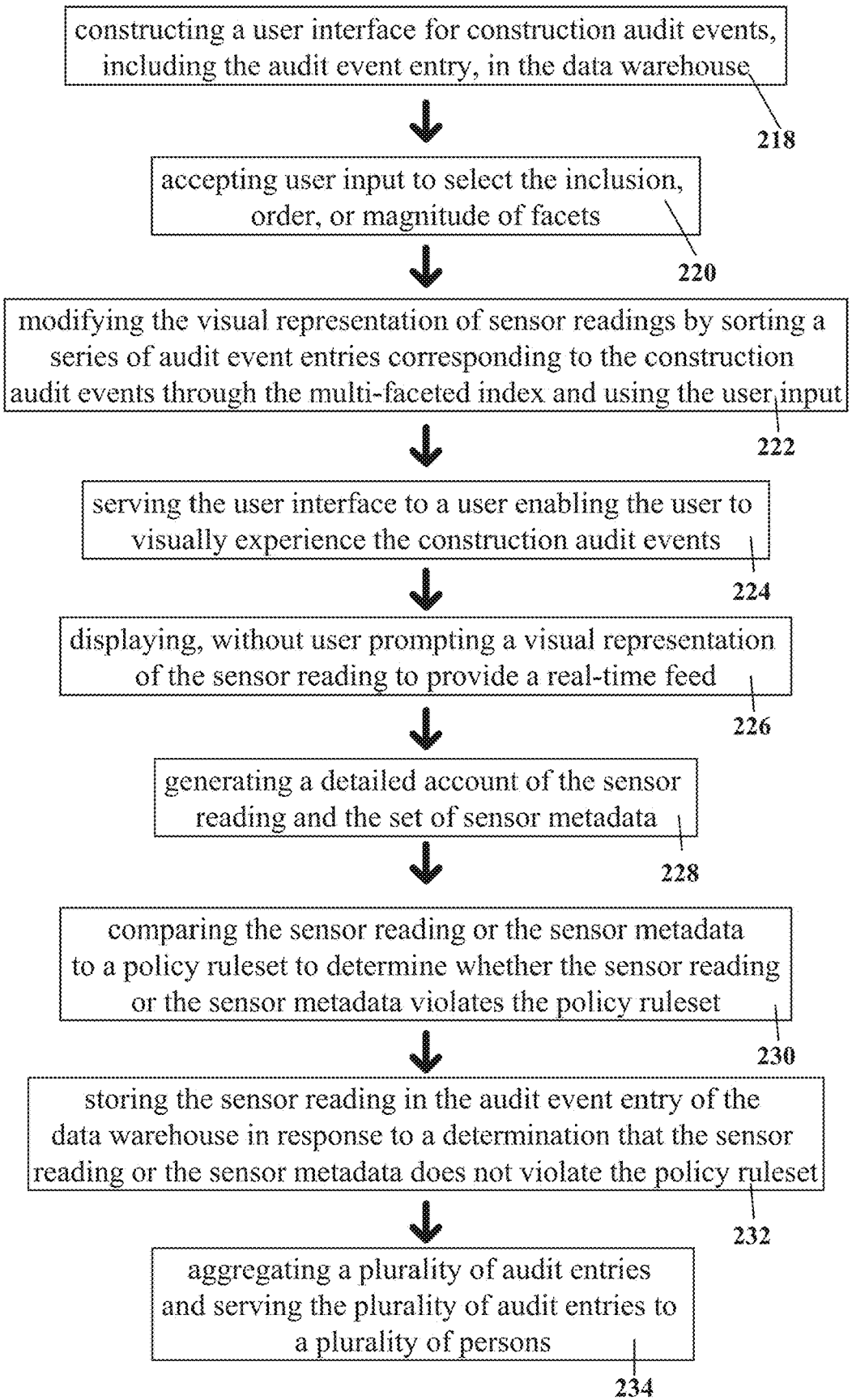
FIG. 2B is a chart depicting a portion of various operations involved in a method of an automated construction site visual audit log.

In operation and use, a method 200 for an automated construction site visual audit log may be provided as shown in FIG. 2. The method may include receiving, at a receiver, a data package originating at a device at a construction site of a construction project. (202) The data package may include a sensor reading of a portion of a construction site relevant to a construction trade. The sensor reading may be generated by a sensor that is part of a device manipulated by a person performing construction tasks pursuant to the construction trade at the construction site. The sensor may measure photons to produce the sensor reading and the sensor reading may represent a construction audit event at the construction site that is relevant to a construction team for ongoing tracking, managing, or chronologizing of the construction project. In one or more embodiments, the method may include details associated with capturing the sensor reading and metadata. For example, the method may include executing software on the device that, when operating: controls the sensor to capture the sensor reading, triggers the generation of the sensor metadata, creates the data package, and controls a transmitter to transmit the data package. (204) The software, when operating, may provide an interface for capturing a portion of the sensor metadata from the person (206) and the method may also include inputting, by the person, the portion of the sensor metadata (208).

The data package may also include a set of sensor metadata that corresponds to the sensor reading. The set of sensor metadata may include a sensor type, metrics of the sensor when the sensor reading was captured, a time the sensor reading was captured, a geographic location the sensor reading was captured, an orientation of the sensor when the sensor reading was captured, and/or a field-of-view of the sensor when the sensor reading was captured. The sensor metadata may also include an identity of the person, an identity of an entity with responsibility for the sensor, and/or an identity of the construction site. The sensor metadata may also include a dialogue providing project relevant context to the construction audit event, a label identifying the sensor reading as being part of a particular category, and/or identifications of other persons on the construction project. The sensor metadata may also include a key identifying another sensor reading.

The method may also include storing the sensor reading in an audit event entry of a data warehouse (210) and updating a multi-faceted index of the data warehouse (212). The updating may include linking one or more members of the set of sensor metadata to the audit event entry and linking one or more members of a set of audit metadata to the audit event entry.

The audit metadata may include a sensor type, metrics of the sensor when the sensor reading was captured, a time the sensor reading was received, a geographic location the sensor reading was captured, an orientation of the sensor when the sensor reading was captured, and/or a field-of-view of the sensor when the sensor reading was captured. In one or more embodiments, the audit metadata may include an identity of the person, an identity of an entity with responsibility for the sensor, and/or an identity of the construction site. The audit metadata may also include a classification of an item discernable from the sensor reading or the sensor metadata and may include a chronologize or history, performance or action, question or query, and/or a keyword or keywords. The audit metadata may also include the construction project to which at least one of the person, the sensor, or the construction site is attached, and/or identifications of other persons on the construction project. The audit metadata may also include a key identifying another sensor reading.

In one or more embodiments, a member of the set of audit metadata may be generated by a machine learning engine (214). For example, the member of the set of audit metadata may be an inference based on a new set of sensor metadata and a plurality of stored sets of audit metadata. In one or more embodiments, the method may include producing an inference result of the machine learning engine and presenting the inference result to the user. (216).

The data warehouse with multi-faceted index may form a hyperindex visual chronicle of the construction project. The method may also include constructing a user interface for construction audit events, including the audit event entry, in the data warehouse. (218) The constructed user interface may include a visual representation of sensor readings organized by the multifaceted index. The user interface may also include user interface elements for one or more facet controls. The facet controls may be adapted to accept user input to select the inclusion, order, or magnitude of facets. (220) The selection may allow for modifying the visual representation of sensor readings by sorting a series of audit event entries corresponding to the construction audit events through the multi-faceted index and using the user input. (222) The method may also include serving the user interface to a user enabling the user to visually experience the construction audit events. (224) The method may also include displaying, without user prompting, a visual representation of the sensor reading to provide a real-time feed. (226)

In one or more embodiments, the visual representation of the sensor reading may be a thumbnail image and selection of the thumbnail image may generate a detailed account of the sensor reading and the set of sensor metadata. (228)

In one or more embodiments, the method may also include comparing the sensor reading or the sensor metadata to a policy ruleset to determine whether the sensor reading or the sensor metadata violates the policy ruleset. (230) The method may also include storing the sensor reading in the audit event entry of the data warehouse in response to a determination that the sensor reading or the sensor metadata does not violate the policy ruleset. (232)

In one or more embodiments, the method may also include aggregating a plurality of audit entries and serving the plurality of audit entries to a plurality of persons. (234) In one or more embodiments, aggregating may be based on a common item of metadata across the plurality of audit entries.

Figure 3:
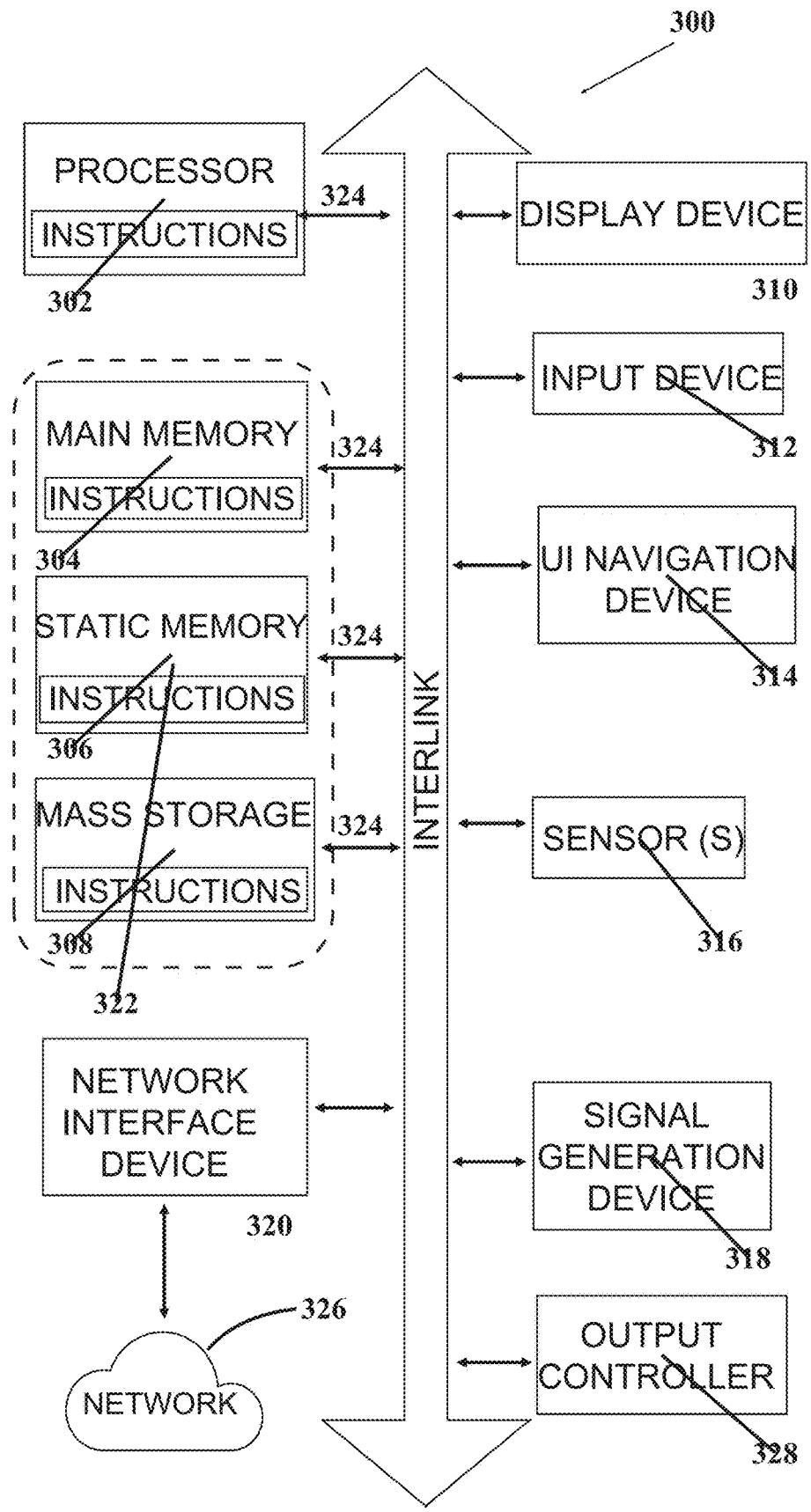
FIG. 3 is a diagram of infrastructure on which the audit logging and chronologizing tool may be situated and may operate, according to one or more embodiments.

FIG. 3 illustrates a block diagram of an example machine 300 upon which any one or more of the techniques (e.g., methodologies) discussed herein may perform. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB), parallel, or other wired or wireless (e.g., infrared (IR)) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) that configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 300, and includes digital or analog communications signals or other intangible medium to facilitate communication of such software.

Figure 4:
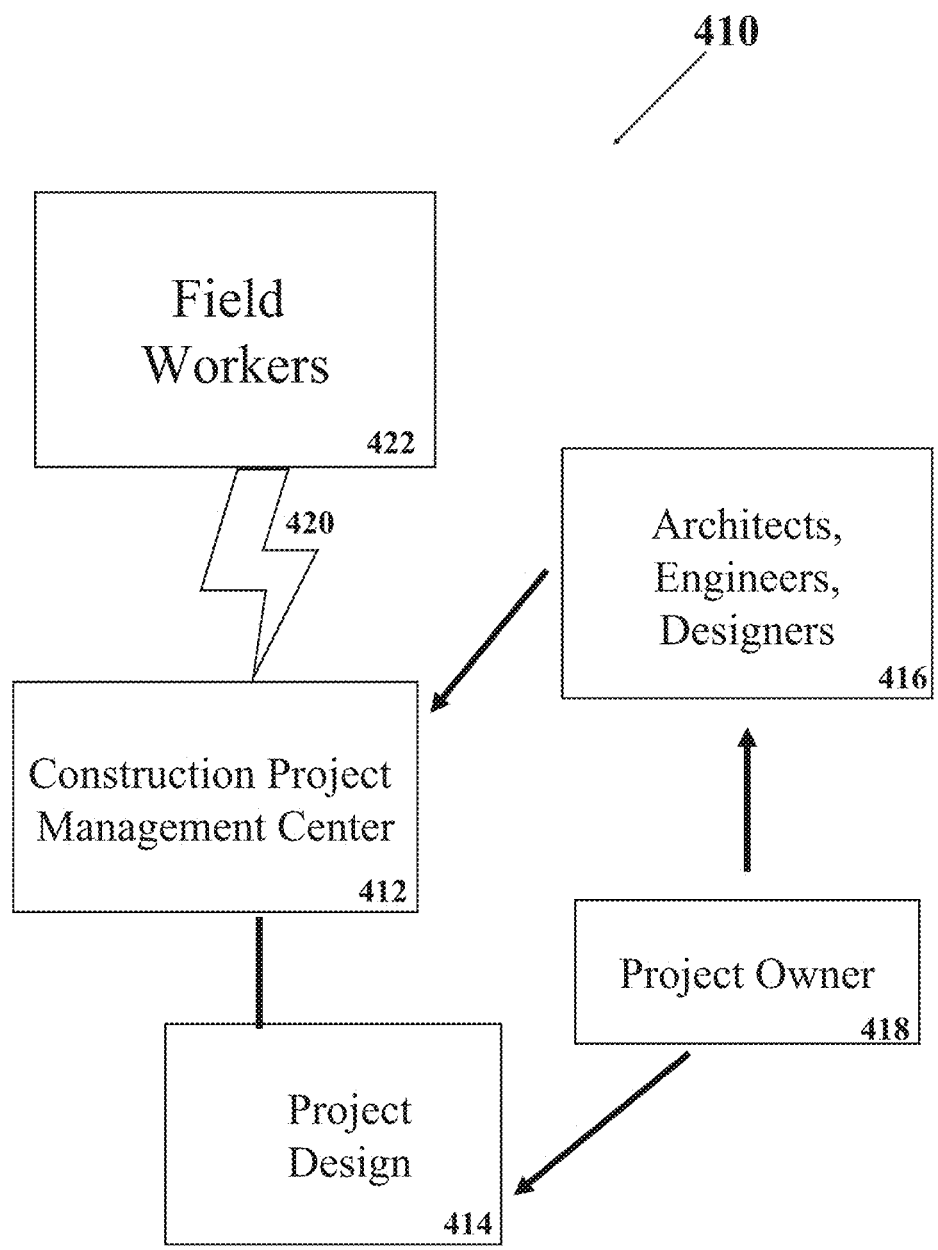
FIG. 4 is a project environment for which the system may be useful, according to one or more embodiments.

One implementation of the system 410 is depicted in FIG. 4. A construction project management center 412 is operated by a company or individual person for purposes of the work project—also known as the "construction manager." The construction manager 412 will construct, install, or produce the work project in accordance with a project design 414 often in the form of drawings, specifications, material lists, work task lists, project budget, etc. One or more persons 416 including architects, engineers, design experts, consultants, etc. may be responsible for developing the project design 414, depending upon the nature of the work project. The owner of the work project 418 has commissioned the design, construction, installation, and production of the work project, usually paying for the work.

The construction project manager 412 has an interface 420 for communicating with or directing the work tasks of the field workers 422 who actually construct, install, or produce the work project. Such field workers can comprise laborers like framers and roofers. They can also comprise other craftsman like electricians, plumbers, HVAC installers, fire monitoring and suppression system installers, security system installers, drywallers, finish carpenters, stone masons, tile installers, etc. While communications may occur in-person or via conventional electronic means such as by telephone, email, facsimiles, letters or other paper documents, for purposes of the present system such interface 420 comprises the transmission of data and written or verbal communications via a computer-based network.

Figure 5:
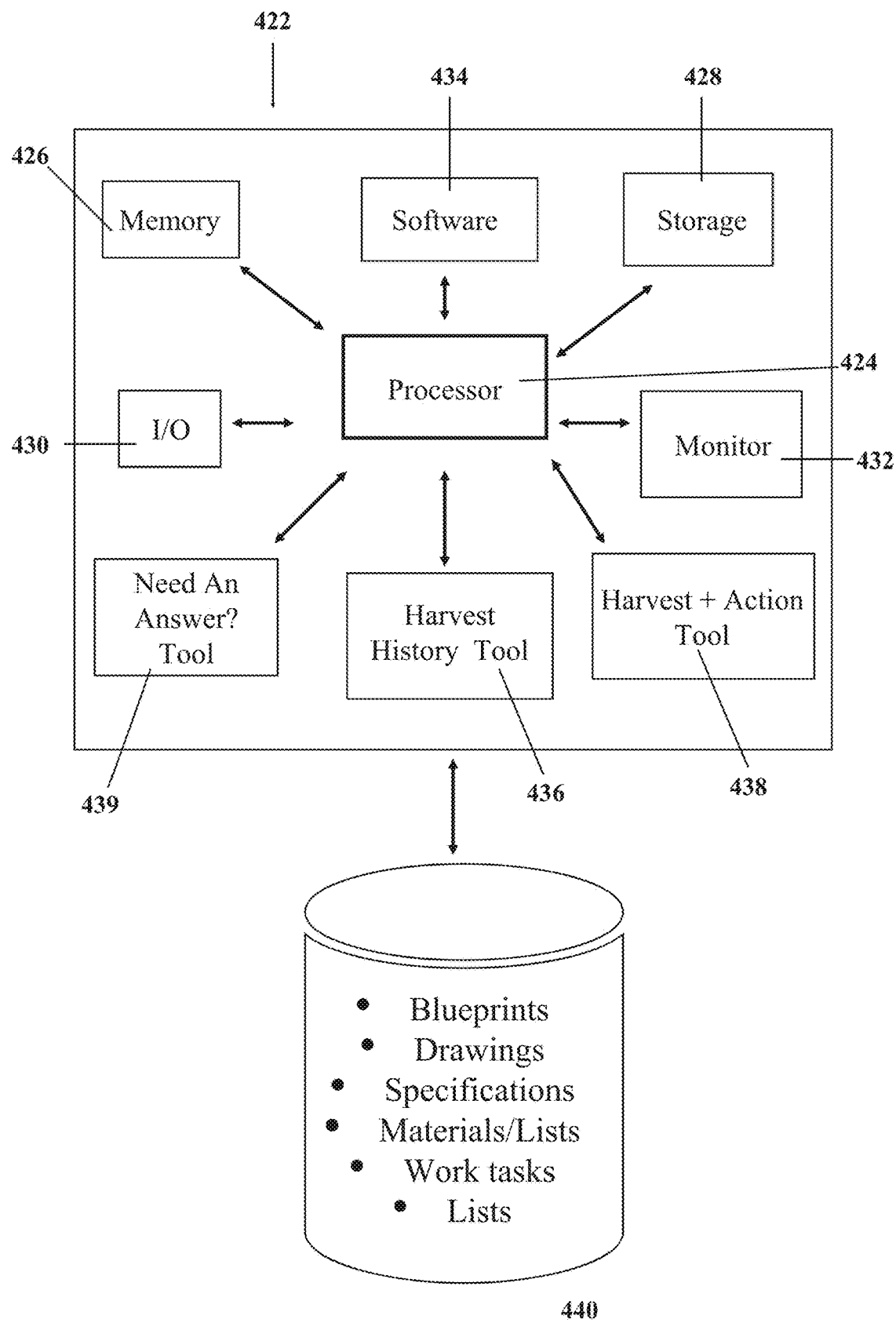
FIG. 5 is a diagram of infrastructure on which the system may operate, according to one or more embodiments.

Referring to the exemplary embodiment of FIG. 5, the system 410 comprises a general programmable computer 422 having a central processing unit ("CPU") 424, controlling a memory unit 426, a storage unit 428, an input/output ("I/O") control unit 430, and at least one monitor 432. Computer 422 operatively connects to database 440, containing, e.g., blueprints and other drawings and specifications for the project design; materials lists; a multitude of work tasks staged in a logically sequenced manner; lists of suppliers, vendors, general contractors, skilled craftsmen, architects, engineers, and designers—complete with telephonic, address, and email contact information for these persons; and project budget documents. It also operatively connects to the History tool 436, Harvest+Action tool 438, and the Need An Answer? Tool 439 that will be described more fully herein. Computer 422 may also include clock circuitry, a data interface, a network controller, and an internal bus. One skilled in the art will recognize that other peripheral components such as printers, drives, keyboards, mousses, and the like can also be used in conjunction with the programmable computer 422. Additionally, one skilled in the art will recognize that the programmable computer 422 can utilize known hardware, software, and the like configurations of varying computer components to optimize the storage and manipulation of the data and other information contained within the automated knowledge management system 410.

The software program 434 may be designed to be an expression of an organized set of instructions in a coded language. These instructions are programmed to facilitate the intake of harvest information and queries from the field workers at the work site, and outflow of processed harvest information to the field workers, project design team members, and subsequent work tasks pushed to or pulled by the field workers at the site.

The computer system on which the system resides may be a standard PC, laptop, mainframe, handheld wireless device, or any automated data processing equipment capable of running software for monitoring the progress of the transplantable material. The CPU controls the computer system and is capable of running the system stored in memory. The memory may include, for example, internal memory such as RAM and/or ROM, external memory such as CD-ROMs, DVDs, flash drives, or any currently existing or future data storage means. The clock circuit may include any type of circuitry capable of generating information indicating the present time and/or date. The clock circuitry may also be capable of being programmed to count down a predetermined or set amount of time.

The data interface allows for communication between one or more networks which may be a LAN (local area network), WAN (wide area network), or any type of network that links each party handling the claim. Different computer systems such as, for example, a laptop and a wireless device typically use different protocols (i.e., different languages). To allow the disparate devices to communicate, the data interface may include or interact with a data conversion program or device to exchange the data. The data interface may also allow disparate devices to communicate through a Public Switched Telephone Network (PSTN), the Internet, and private or semi-private networks. Referring to FIG. 5, knowledge management system 410 includes a software program 434 having a plurality of graphic user interfaces ("GUIs") that are displayed to a user in a text or graphical form to permit the input of data or queries concerning completed or pending work tasks at the work site, and the outflow of updated work tasks, and answers to those submitted queries. The GUI can also be used to display the status of the work tasks to the construction manager, design team members, and project owner, as well as the relevant field workers. The software program 434 can also produce and print a series of reports documenting this information.

One of the principal advantages of the system 410 is that data and information may be harvested (sent) to and received from the knowledge management system 410 by the field worker 422 by means of a tablet computer or other computing device. For example, the field worker may use an Apple iPad® or a Smart phone like an Apple iPhone® or a Samsung Galaxy®. The system may be built on a progressive web app architecture allowing for minimal storage and CPU usage on the client device with the majority of the information and data processing taking place on the centralized servers, or in the "cloud."

Figure 6:
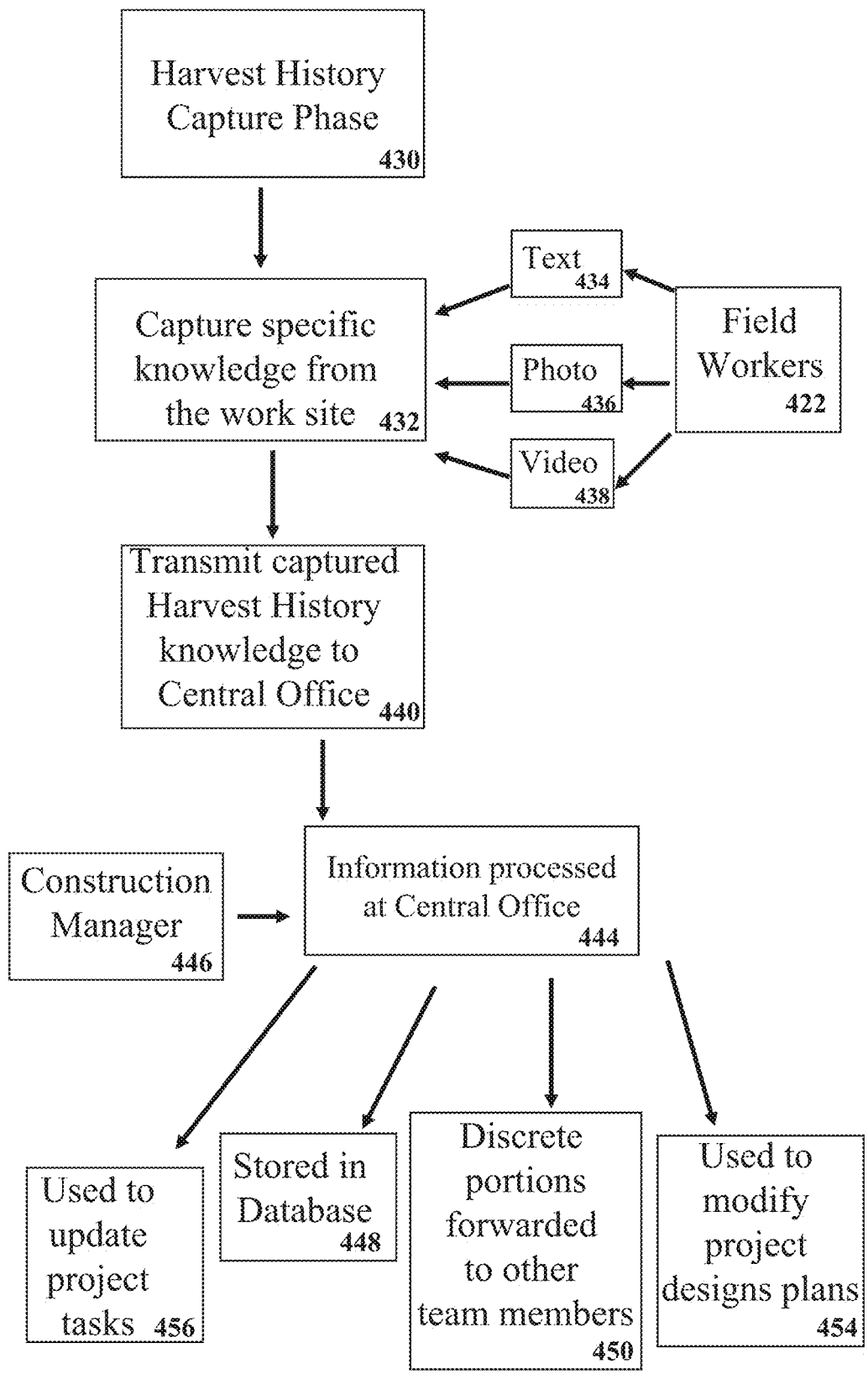
FIG. 6 is a data flow diagram of the system, according to one or more embodiments.

The system 410 may include a series of graphical user interface ("GUI") screens. FIG. 6 comprises a schematic diagram depicting the "Harvest History" portion of the system 410. In the Harvest History capture phase 430, specific knowledge about the work project is captured by field workers 422 at the work site. This is useful to the work project because the field workers are remotely located at the work site proximate to the actual work that is being accomplished. Thus, they are better able to capture the reality of the work project in its actual constructed, installed, or produced state than the construction manager, design team members, or project owner who are usually located in their offices, and may only occasionally visit the work site, if at all.

The timely data collection of the who, what, where, when, why and how from the front line of the field is helpful to obtaining improvement in labor efficiencies. In addition, as field workers are not commonly available for communication and information work, the raw collection of data may quickly and easily be captured using the system and may enter a curation step by knowledge workers, assisted by computer processing, artificial intelligence and machine learning to properly correct data input errors, add contextual information missing or needed, and connecting this new data to the relevant stakeholders that should see this information now or later. An integral part of the knowledge management system involves capturing the "why" of what the field person was doing, which may have great immediate and historical importance.

The field workers 422 may digitally capture historical information about the status of the work project or a specific work task that they are undertaking. Such historical information should comprise who is performing the specific work task, what is being done under the work task, when it is accomplished, and where with respect to the building or infrastructure of the work project the specific work task is being performed. The historical information should also include the why and how—namely, how is the specific task being performed in terms of materials, location, and installation technique. This last historic information capture for the work task may be helpful because the how parameters may deviate from the blueprints, specifications, and other instructions provided by the design team. Such deviations may be unintentional in which case it can be helpful to communicate this information to the construction manager and design team members in case the work task should be redone properly in accordance with the blue prints, specifications, and other instructions. Otherwise, the blueprints, specifications, and other instructions for subsequent tasks may need to be modified in order to fit this specific performed work task.

Figure 7:
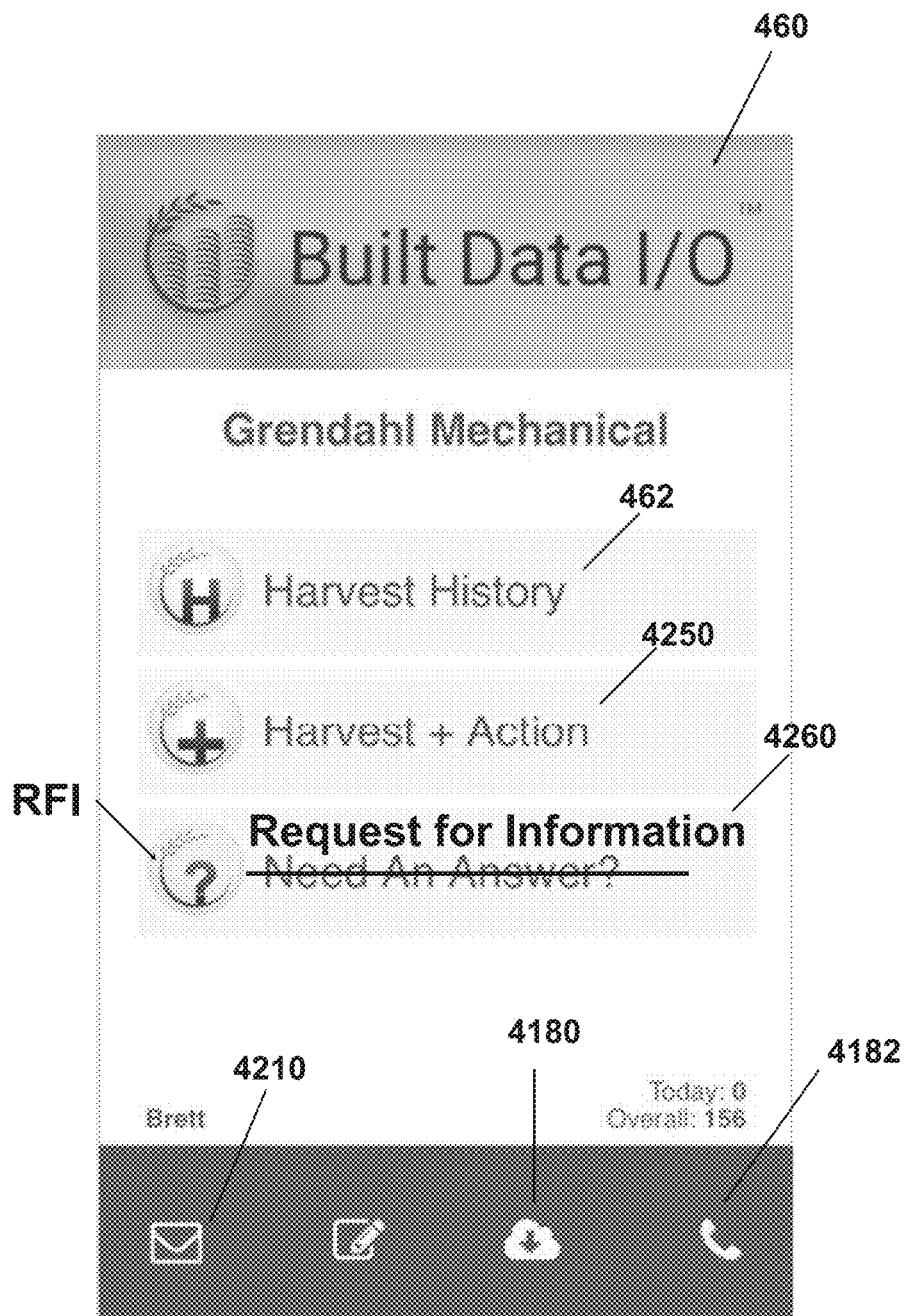
FIG. 7 is a diagram of a home screen interface, according to one or more embodiments.

Turning to FIG. 7, the home screen 460 is shown on the Smart phone or tablet computer device used by the field worker 422 to send and receive information via the knowledge management system 410. By pressing the Harvest History icon 462, the field worker 422 progresses to the next GUI screen 464 for purposes of entering the historical information for the work task.

Figure 8:
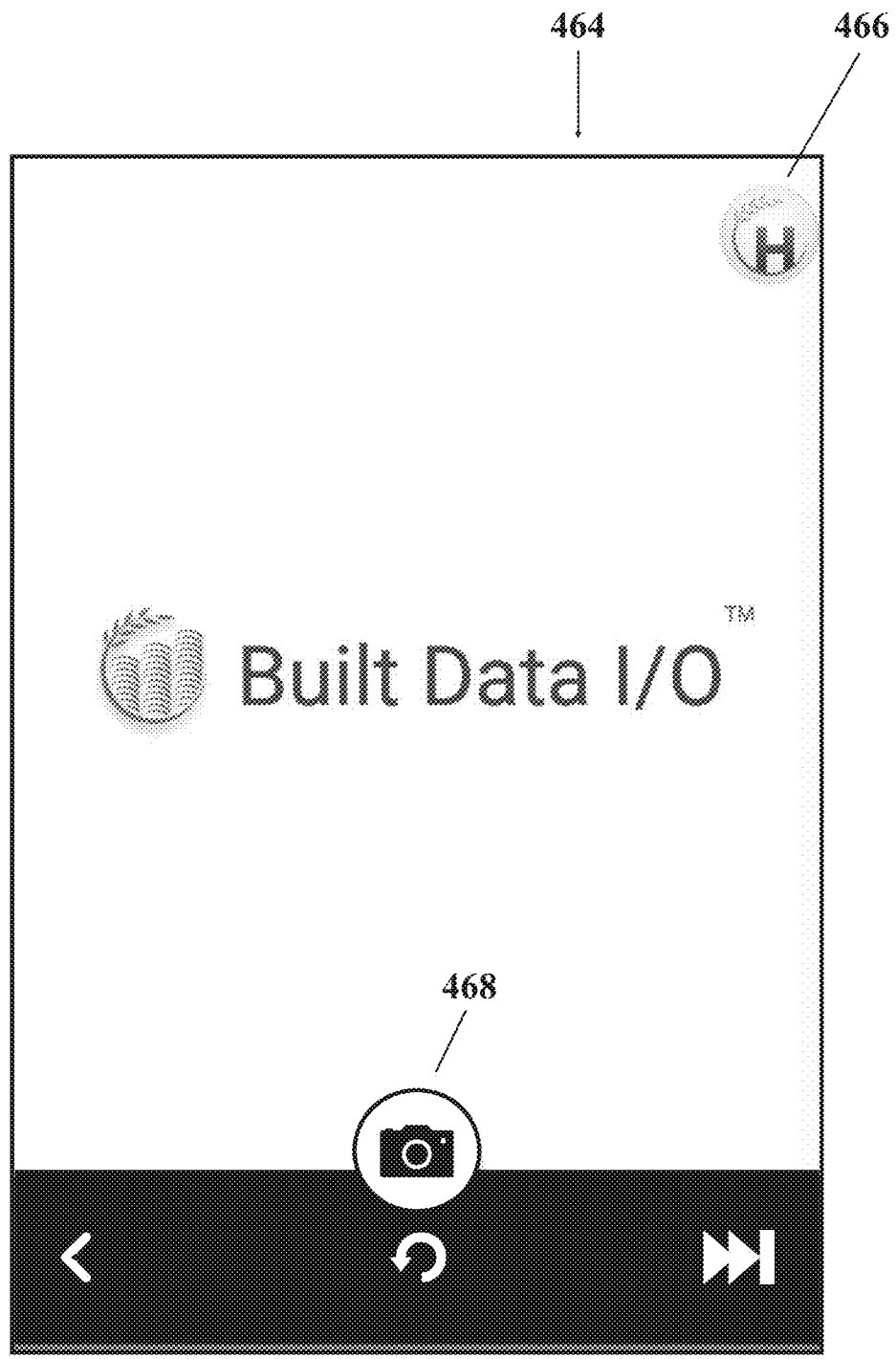
FIG. 8 is a diagram of a sensor operating screen interface, according to one or more embodiments.

The Harvest History historical information capture screen 464 is depicted in FIG. 8. The "H" icon 466 shown in the upper right corner of the screen shows the user that he is in the Harvest History capture mode. A camera icon 468 is located in the lower portion of screen 464. This icon is pressed in order to harvest photo data.

Figure 9:
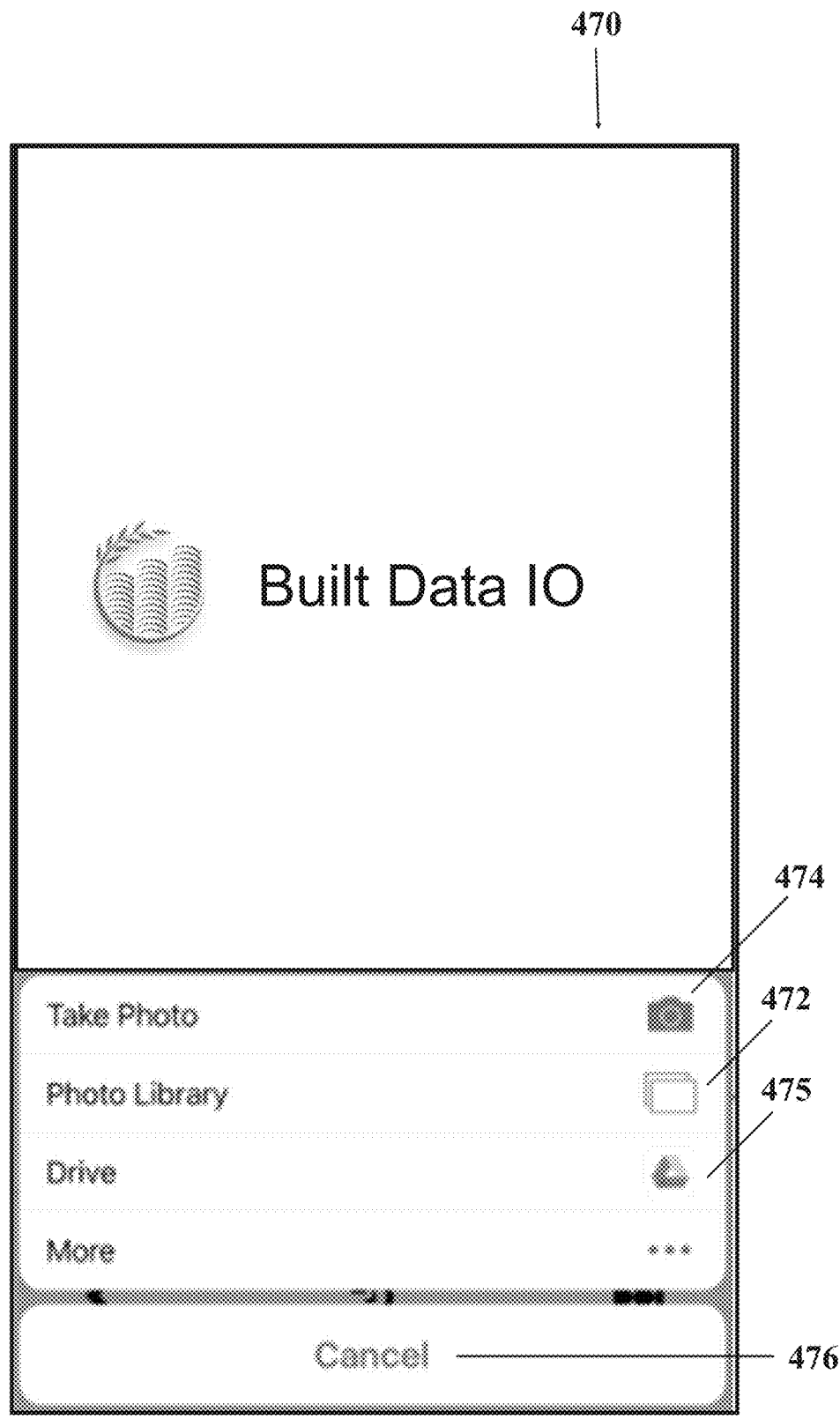
FIG. 9 is a sensor reading source selection screen interface, according to one or more embodiments.

By pressing the camera icon 468, the user is taken to the GUI screen 470 shown in FIG. 9 for designating the source of the photograph. Selection of the "Photo Library" icon 472 will allow the user to choose a photograph that was already taken, and is stored in the photo library of the tablet computer or Smart phone device associated with the device. Likewise, pressing the "Drive" icon 475 will enable the user to select a photograph that was already taken, and is stored in a "cloud" storage account associated with the tablet computer or smart phone device, such as Google Drive, Apple iCloud, or Drop box. Otherwise, pressing the "Take Photo" icon 474 enables the user to use his Smart phone or tablet computer to take a new photograph of some aspect of the work project at the work site. If the user did not mean to select the photo option, then he can press the "Cancel" icon 476 in which case he will be returned to the home screen 460 depicted in FIG. 7.

Figure 10:
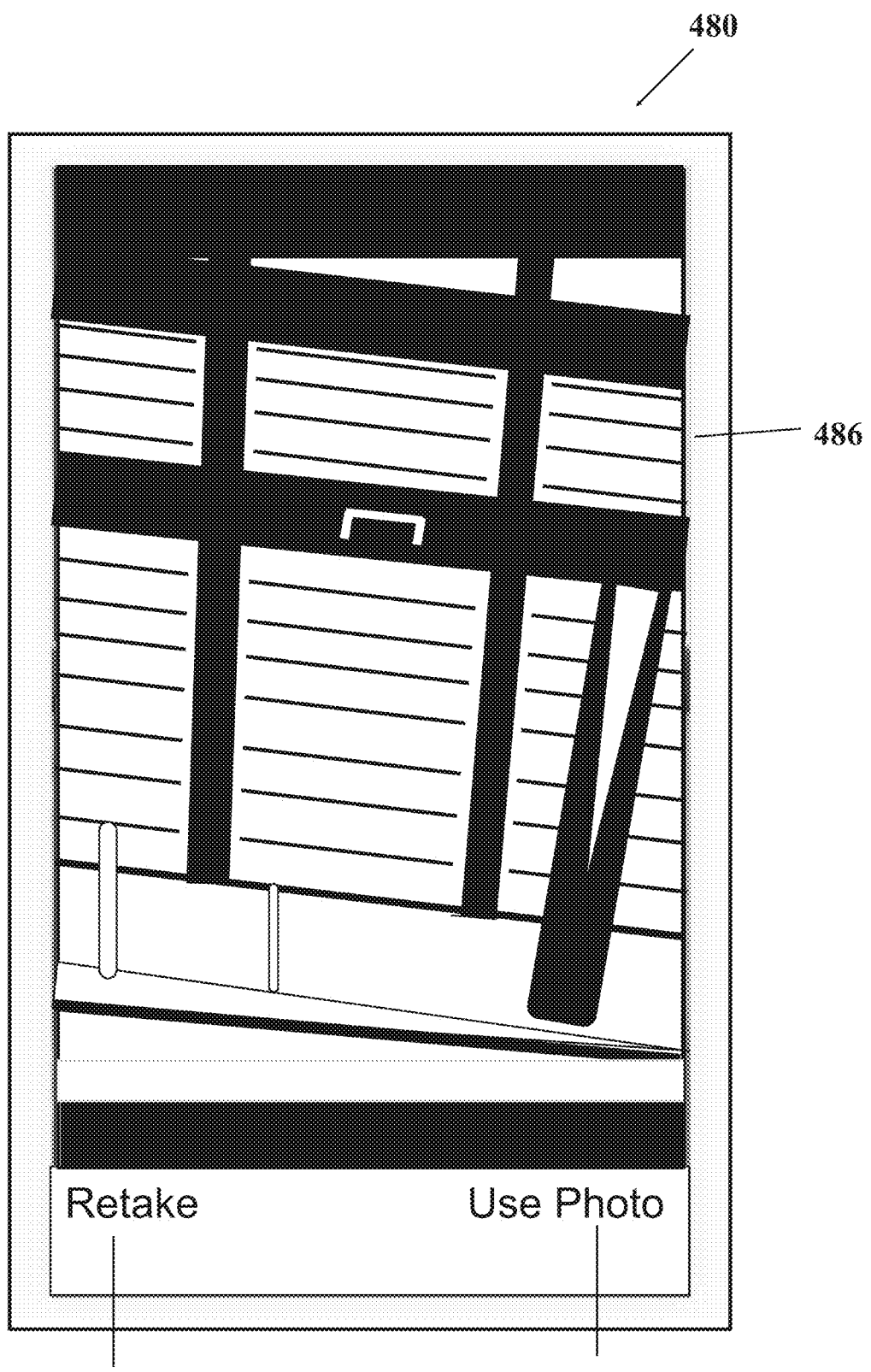
FIG. 10 is a sensor reading selection screen interface, according to one or more embodiments.

FIG. 10 depicts the photo selection screen 480 that results after the user takes a photograph—in this case a photograph of a motorized damper installed in the interior space of a building under construction or renovation. The photograph 486 is clearly shown on the GUI screen for visual inspection by the user to ensure that he is pleased with the clarity of the photo. If the user wishes to use the photograph for his historical information capture, then he presses the "Use Photo" icon 482 located in the bottom right corner of the screen. If on the other hand, the user is displeased with the photograph, then he can select the "Retake" icon 484 located in the bottom left corner of the GUI screen. In this case, he will be directed back to the GUI screen 470 where he can press the "Take Photo" icon 474 to take another photograph of the motorized damper.

Figure 11:
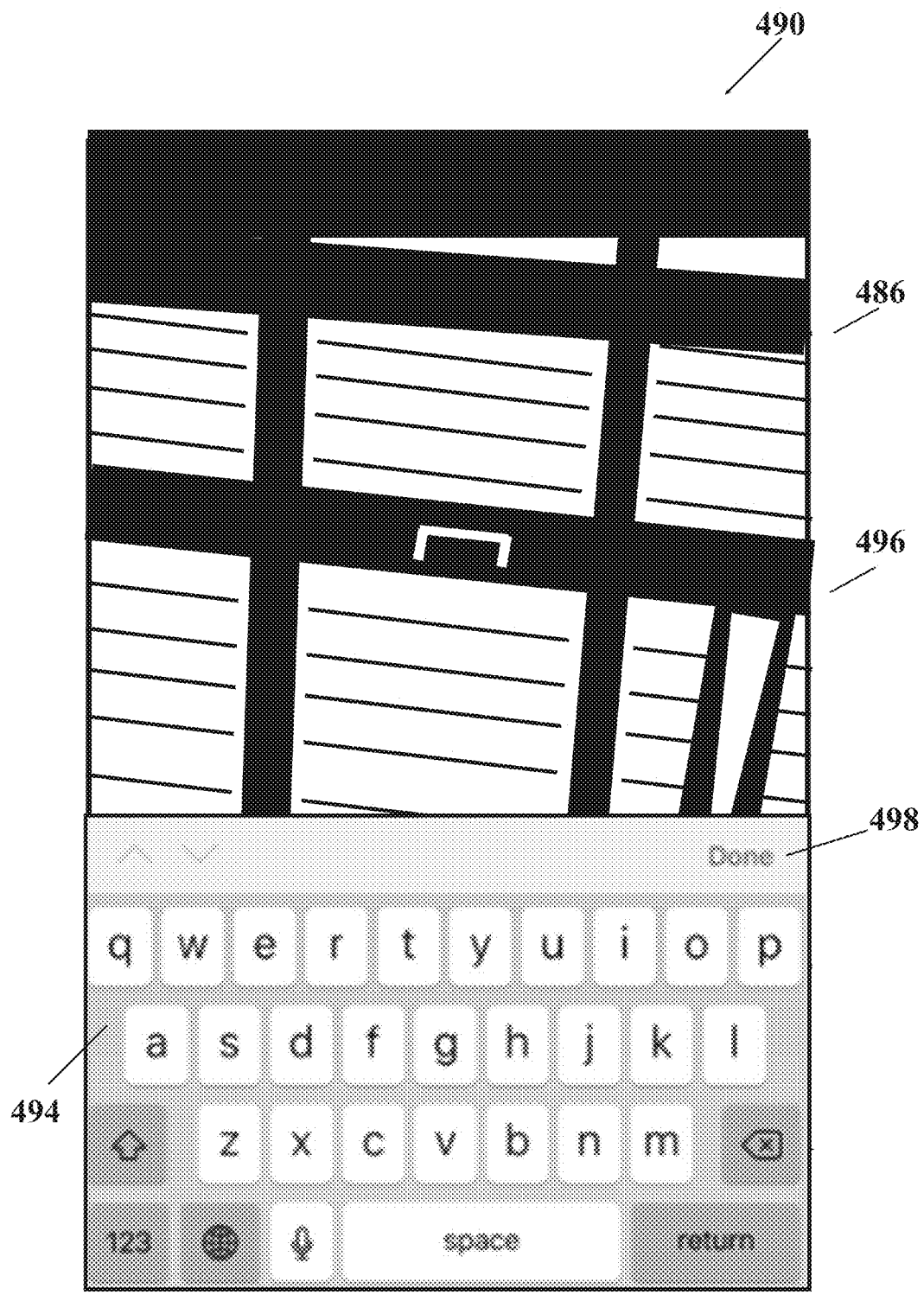
FIG. 11 is a dialogue metadata screen interface, according to one or more embodiments.
Figure 12:
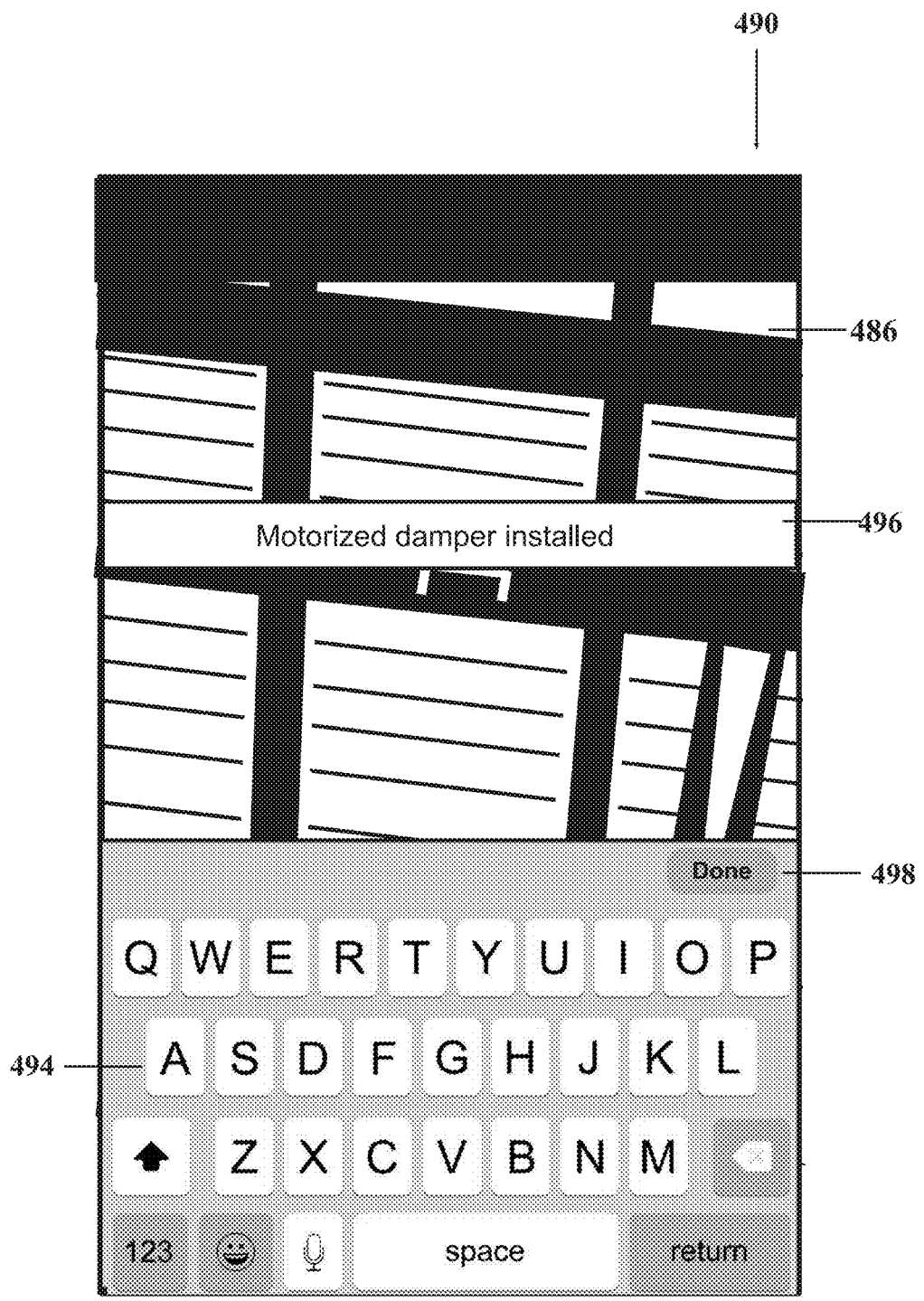
FIG. 12 is another view of the dialogue metadata screen interface, according to one or more embodiments.

Following the user's selection of the photograph, the screen 490 shown in FIG. 11 appears on the user's tablet computer or Smart phone device. The photograph 486 appears in the upper portion of the screen. In the lower portion of the screen is a keyboard 494 for entry by the user of text information into a field 496 that is superimposed on top of the photo 486. Alternatively, the field 496 could appear above or below the photo on the GUI screen 490, so as not to interfere with the visual appearance of the photo image. The user may use the keyboard 494 to add narrative data and information to the selected photograph. For example, the phrase "Motorized damper installed" has been entered into the field 496 of the GUI screen 490 shown in FIG. 12. Once the desired narrative information has been entered by the user into field 496, the "Done" icon 498 can be selected in order to complete the population of the dialogue metadata.

Figure 13:
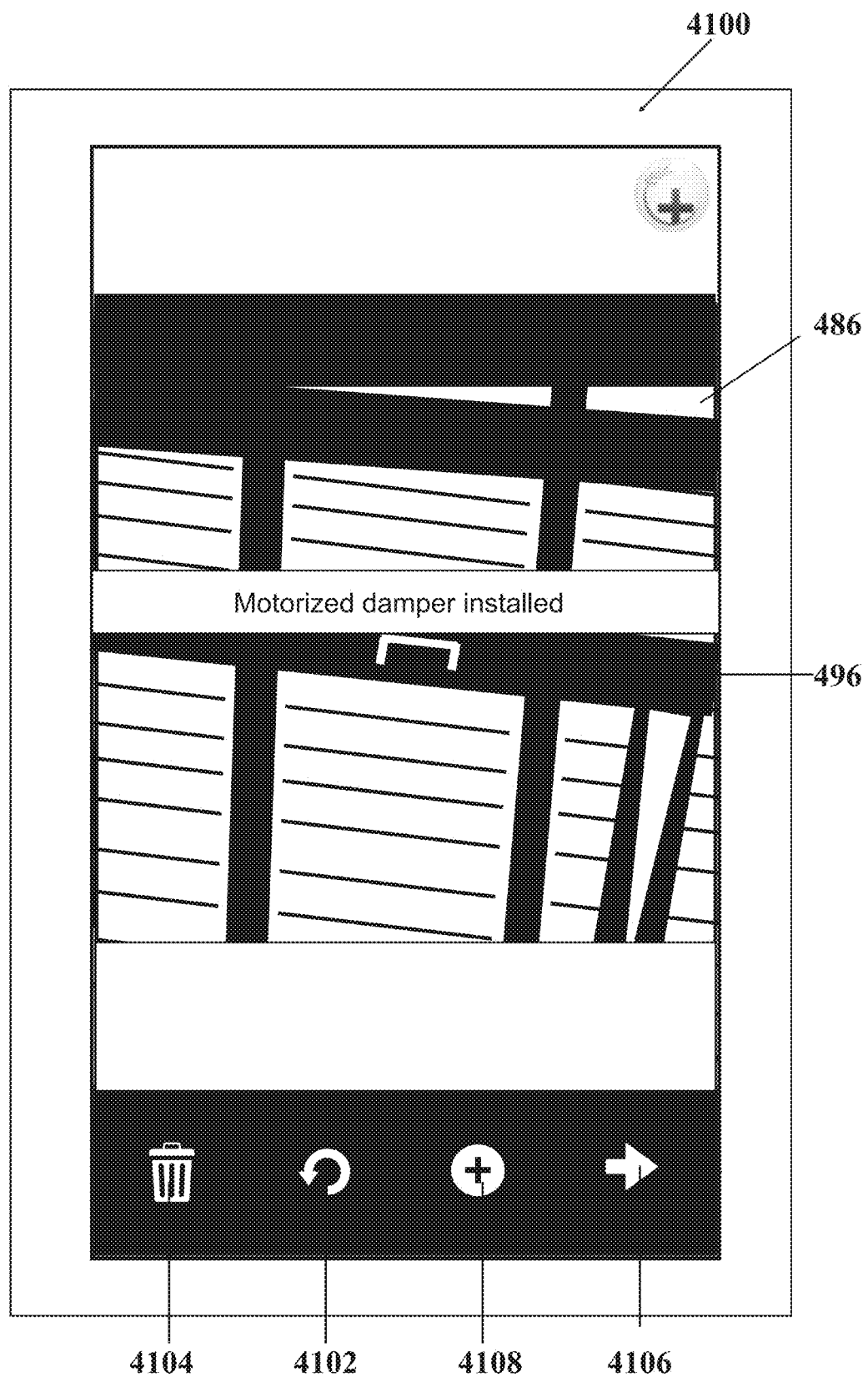
FIG. 13 is yet another view of the dialogue metadata screen interface, according to one or more embodiments.

The system 410 permits the user to send multiple photographs containing narrative text messages to cumulatively create a historical information record related to a work task undertaken for the work project. The user is taken by the software program to GUI review screen 4100 shown in FIG. 13. The last entered photograph 486 and narrative text message 496 for the current historic information harvest appears on the screen. But, a series of button icons also appear at the bottom of the screen. The "backwards arrow" icon 4102 will take the user back to screen 490 (FIG. 12) for reentering the narrative information into field 496. This information allows the user to modify or replace the narrative information associated with the photograph 486.

But, if the user does not want to include the particular photograph in the harvest collection, the "trash can" icon 4104 may be selected to delete the photograph. Meanwhile, the "forwards" icon 4106 may be selected by the user to advance to screen 4110 (FIG. 14) for tagging the photograph meanwhile, contained in the current harvest.

Figure 14:
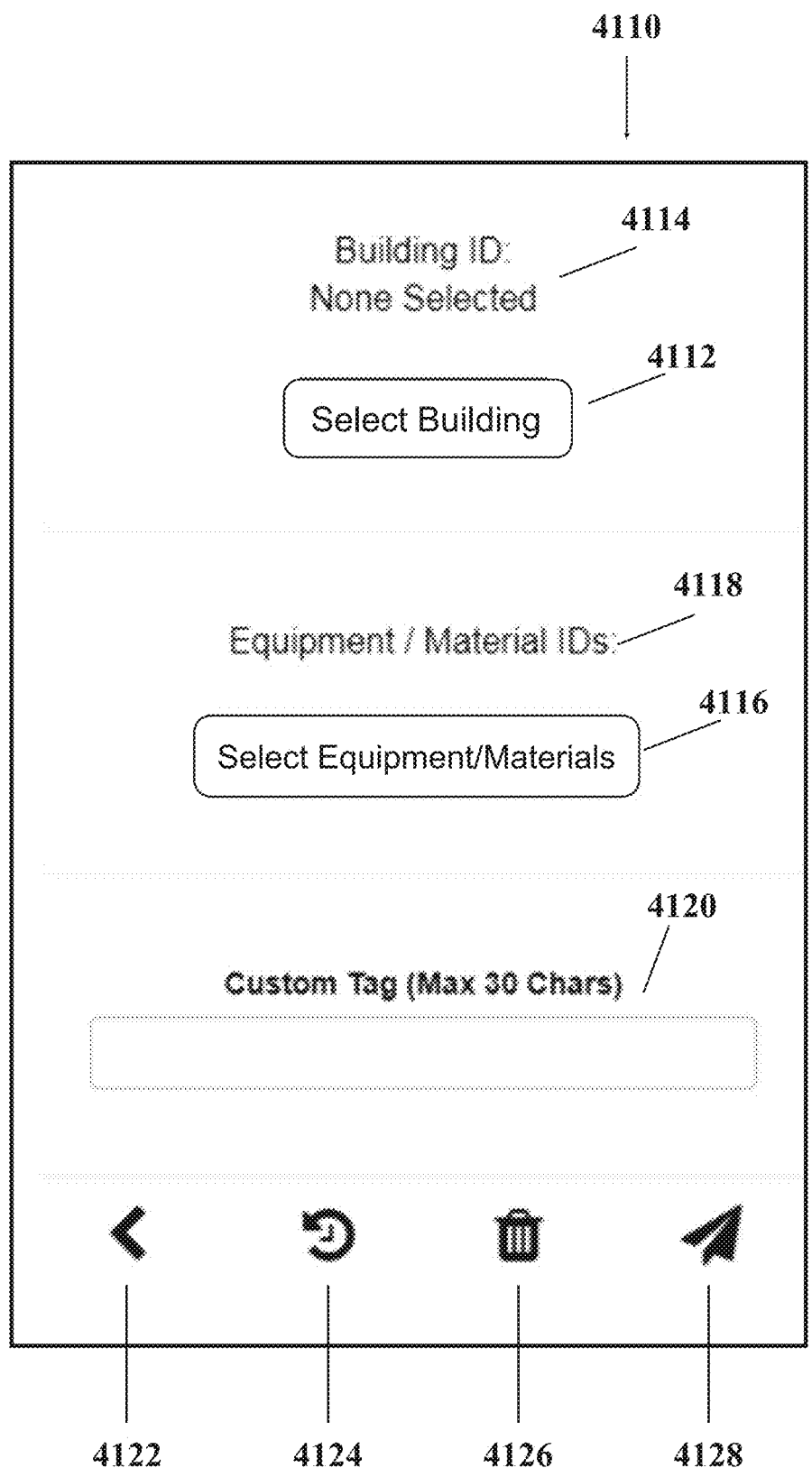
FIG. 14 is another dialogue metadata screen interface, according to one or more embodiments.

As shown in FIG. 14, this tagging screen 4110 contains a drop-down sub-screen 4112 for selecting the particular work project. The specific work project selected by the user will be entered into field 4114. Alternatively, selection of icon 4112 can provide the user a key board for entering this information. Another drop-down screen 4116 for selecting the particular piece of equipment or material relating to the specific work task also appears on the screen 4110. The specific equipment or materials selected by the user will be entered into field 4118. Alternatively, selection of icon 4116 can provide the user a keyboard for entering this information. Finally, the user may enter additional descriptive or explanatory information (up to 30 characters) into field 4120 to summarize the collection of tagged photographs, once the user presses the text bar 4120. In this manner, the collected harvest containing photograph 486 is accompanied by identifying information for the project 4114, piece of equipment 4118 being worked on, and any additional descriptive information added to field 4120, so that the recipients of the harvest can clearly understand what is being conveyed by the user.

Once this process is completed, the user may press the send icon 4128 to prepare the collective historical information harvest containing the tagged photograph 456 for transmission via the knowledge management system 410 to the centralized hub 440, as shown in FIG. 6. But alternatively, the user may wish to add another photograph to the collected harvest. The backwards arrow icon 4122 will take the user back to GUI screen 464 shown in FIG. 8 to start the process once again for selecting, taking, and tagging another photograph using the sequence of actions and GUI screens described above. The user may also select the "circle plus" icon 4108 shown on GUI screen 4100 of FIG. 13 during the photograph labeling step to add another photograph or other content (e.g., video, text message) to the collected harvest.

Selection of the "circle back" icon 4124 appearing on the bottom of GUI screen 4110 (FIG. 14) will provide the user with a convenient list of each photograph and its accompanying descriptors and narrative information that has already been added to the collected harvest. This function helps the user to remember each of the photographs and accompanying information to determine whether any new photographs are needed to complete the content of the collected harvest, or whether any of the photographs should be deleted or replaced. The "trash can" icon 4126 found on GUI screen 4110 allows the user to delete the photograph.

Figure 15:
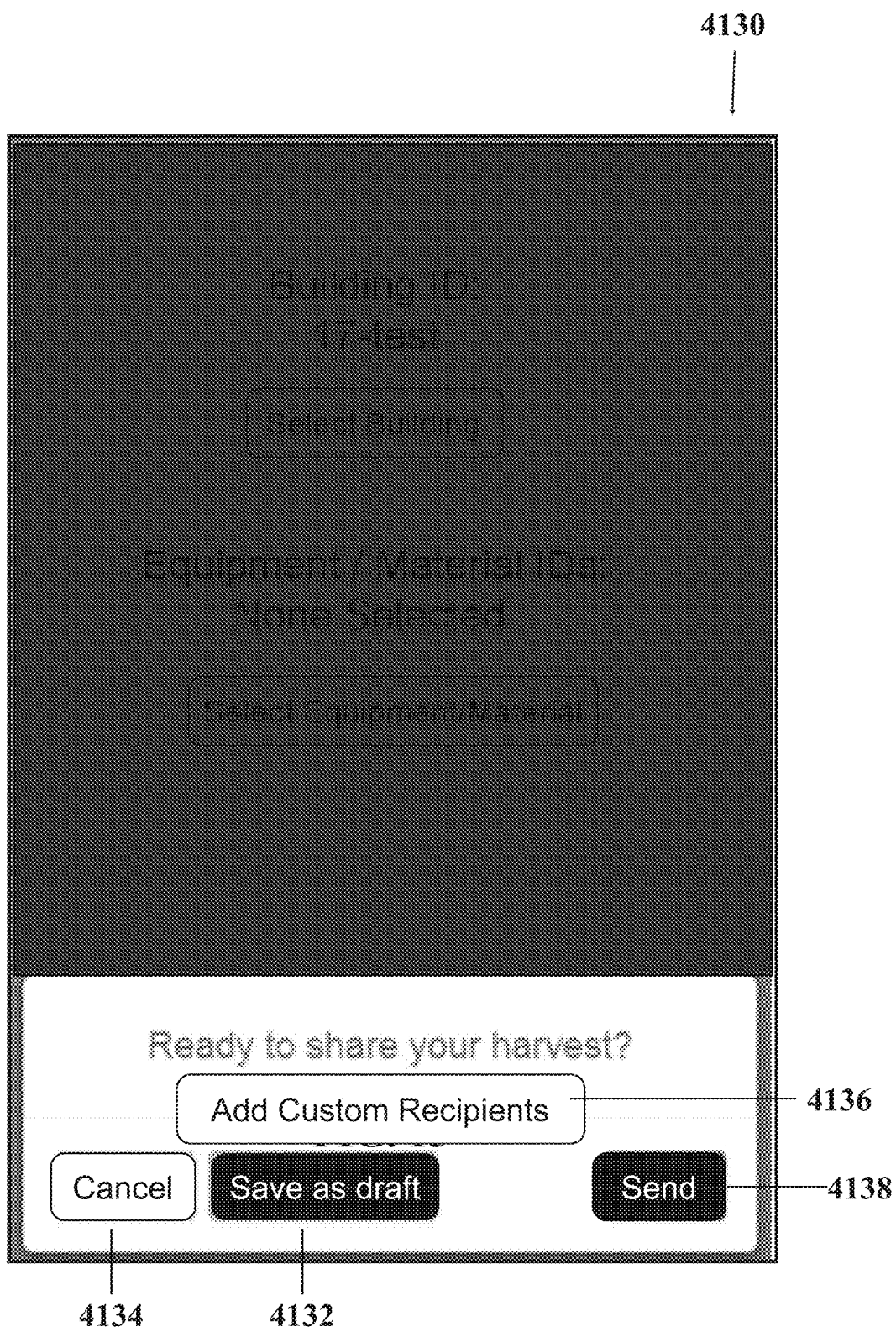
FIG. 15 is a confirmation screen interface, according to one or more embodiments.

If the user selects the "send" icon 4128 on the GUI screen 4110 (FIG. 14), then he is provided a confirmatory screen 4130 shown in FIG. 15 that prompts the user to save the harvest message as a draft via icon 4132. The process can also be cancelled via icon 4134. A customized list of recipients for the harvest message may be created via icon 4136. Finally, selection of the send icon 4138 will cause the saved harvest message and its collectively photographic contents to be forwarded to the centralized hub 440 as well as the selected recipients.

Figure 16:
FIG. 16 is a completion screen interface, according to one or more embodiments.
Figure 16:
Figure 16:
Figure 16:

The user will then be taken to the Harvest Sent screen 4140 shown in FIG. 16. It looks like the home screen 460 of FIG. 7 except that a "Harvest Sent—Harvest Success!" message 4142 appears at the bottom of the screen. This confirms for the user that his harvest message has been successfully sent and received by the centralized hub 440 and the selected recipients. Now the user can create another harvest message or resume work on the current or a new work task at the work site.

Figure 17:
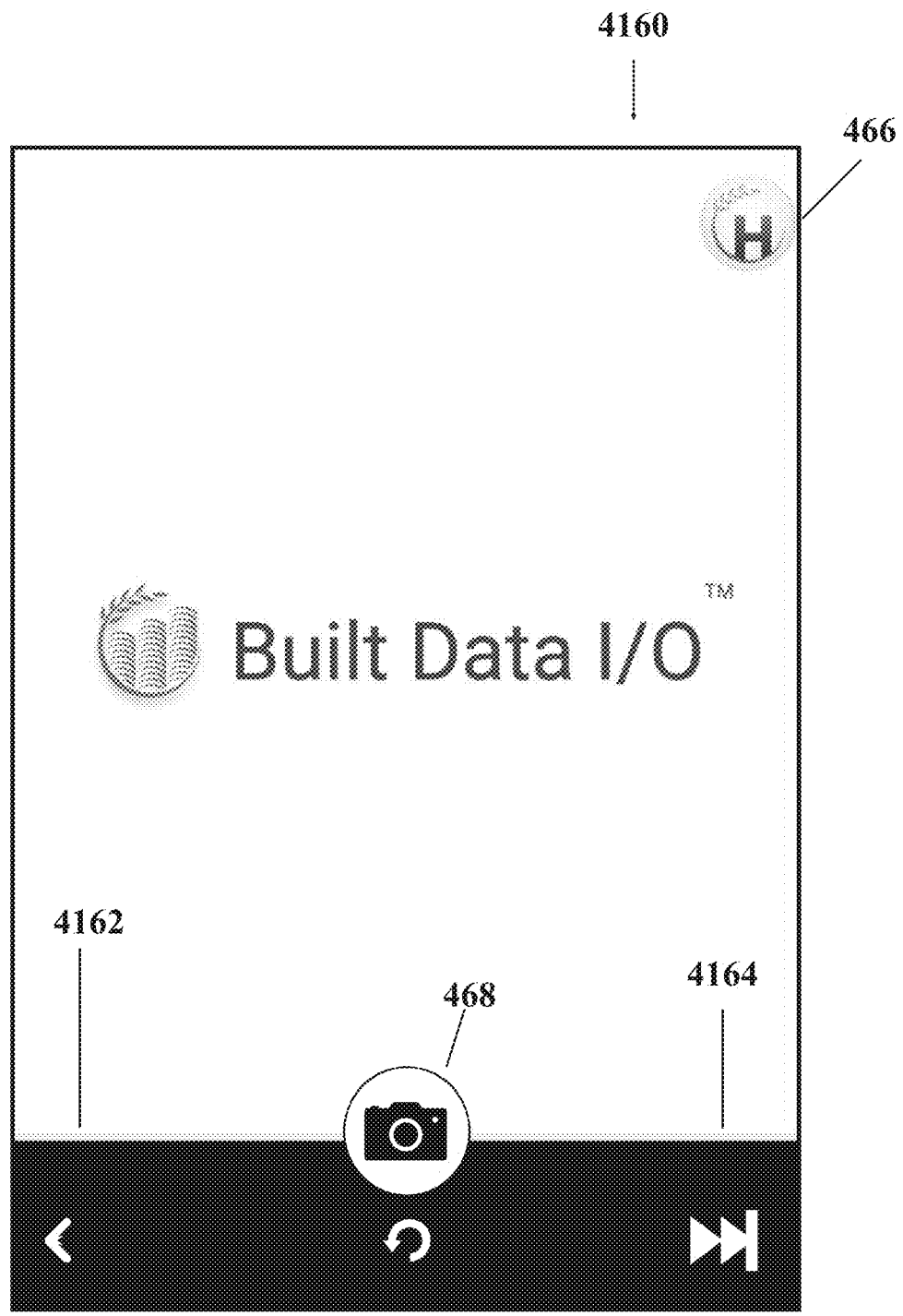
FIG. 17 is another sensor reading source selection screen interface, according to one or more embodiments.

While the harvest collection function 462 accessed from the home screen 460 in FIG. 7 has been described in terms of photographs, other forms of information harvests are possible. For example, selection of the harvest icon 462 on the home screen can take the user to GUI screen 4160 shown in FIG. 17 that contains additional source icons for the harvesting of the information. For example, icon 4162 allows the user to take a short video to create a video file of a piece of equipment, layout of equipment in a building, the current environment in a building into which a piece of equipment is the be installed, etc.

Once the video icon 4162 is selected, the user will be presented a series of GUI screens for selecting the source of the video corresponding to FIG. 9 (i.e., creating a new video or choosing an existing video from the tablet computer's or smart phone's library storage or an associated cloud storage), taking and tagging a new video corresponding to FIGS. 10-13, and preparing, describing, and sending one or more video files as a collected harvest corresponding to FIGS. 14-16. While photographs may be quick and easy to take, videos provide additional benefits including foregoing the need for multiple photos to describe an equipment installation or problem encountered during an installation, and the ability to add audio to the video image to describe what is being conveyed.

Alternatively, the user has the option to send a purely text message for the information harvest. In that case, the text information icon 4164 is selected on the GUI screen 4160 shown in FIG. 17. A keyboard will then be provided to the user to enter the text and information required for the harvest information.

Once the harvested historical information message 440 is received by the centralized hub 444, It needs to be processed pursuant to the construction/project manager function 446. For purposes of this application, this process is called "curation." This curation further may be provided by a human staff member. More preferably, it is performed automatically by the computer software 434 based upon rules and algorithms associated with the software that runs the knowledge management system 410.

The system 410 of the present invention comprises a hyperindex visual chronicle for the benefit of all the project stakeholders (e.g., owners, architects, designers, engineers, consultants, general contractors) and field workers (unskilled laborers and skilled craftsmen) assigned to a work project. Projects, especially within the construction (AED) industry, have tended to operate within silos where information is horded and not shared between persons having a need to know that information to perform their assigned work tasks.

This lack of information can lead to wasted time and process inefficiencies. For example, workers (both unskilled laborers and skilled craftsmen) assigned to a work project get shifted to other projects all the time with replacement workers taking their places. If these replacement workers do not know what has been done and needs to be done at the project site, then the performance of the next work tasks by the replacement workers can become slowed down or—even worse—performed incorrectly. The knowledge management system 410 of the present invention can promptly get these replacement workers up to speed.

Likewise, HVAC workers may be scheduled to install their heating, ventilating, and cooling equipment on the roof of a building under construction. But, perhaps the roofers are delayed from installing the roof on the building, because their necessary materials were not delivered to the work site. This means that the HVAC workers cannot install their equipment until the roof has been installed. If the I-IV AC workers were not notified of this situation, they will pay a wasted visit to the project work site. The knowledge management system 410 of the present invention will notify the HVAC workers of this delay and reschedule their task beforehand.

One possible approach would be to post all possibly relevant information for a work project on a common computerized "bulletin board" that all of the persons associated with the project could visit. But, this would require the persons to be proactive to visit the computer database disclosure site and take the time to sort through all of the posted information to select the information that they need. Alternatively, the computer disclosure system could forward all the information to all the persons associated with the work project (complete absence of silos). However, such a "firehose" of information disclosure could easily overwhelm the persons associated with the project, potentially leading them to miss the really relevant information for their assigned work tasks.

Therefore, the common knowledge cloud of the knowledge management system 410 comprises two essential features for the processing of the information and data harvested by the field workers at the project site and transmitted back to the central hub. First, selectively disclosed harvested information should be (pushed) to persons associated with the work project in accordance with their need-to-know that information to perform their assigned work tasks. Second, the knowledge management system 410 should enable the field workers to proactively monitor information harvested by others to selectively view (pull) the information that they need to perform their work tasks. This curation process and relieves the need for human intervention. Field workers are unlikely to follow through upon curating their harvested information prior to transmitting the message to the centralized hub in the knowledge management system, and may lack the necessary knowledge of the overall project to add the necessary context to the content of the harvested message.

Second, the content of the harvested message will be broken up into discrete portions (450). This can be done by a human staff member, or else by the computer applying internal algorithms. Those discrete portions of the information may then be forwarded to different team members of the project based upon a need for them to know the information in order to carry out their responsibilities and assigned work tasks. By providing a team member information that he or she needs to know, the team member can more accurately and efficiently work on the project without the need to root through the entirety of the archived information to determine what is required. Pushing this information forward to individual team members on a need-to-know basis also promotes collaboration for the project, which may encourage further dialogue between team members.

Third, the harvested historical message information may be used by relevant team members, or by the computer applying internal rules and algorithms to modify the project design plans and associated documents (454). This ensures that the project design documentation is up to date to avoid misunderstandings or mistakes by project members as they carry out their work tasks.

Fourth, the harvested message information may be used by human staff members or by the computer applying internal rules and algorithms to update the various future work tasks for the project (456). Depending upon the communicated reality of the project status at the project site, the sequential order or scope of work tasks may need to be modified. This also enables the knowledge management system 410 to push the updated work tasks to the relevant field workers 422. Alternatively, a field worker completing one work task at the project site may pull from the knowledge management system 410 the next work task that he should work on. This promotes efficiency for the work project as the field workers remain busy and productive at the project site without interfering with each other's work tasks.

The automated processing of the harvested information within the knowledge management system 410 may be enabled by a variety of tools and resources. For example, spell checking and auto-correct functionalities incorporated into the software program can correct typographical errors introduced erroneously by the field worker into the harvested message during the curation process. Data lists stored in the database of the knowledge management system 410 can contain words and acronyms that can be added to the harvested message to add context to the message during the curation process. Stored data lists may also be tapped by the system software to add special subject terminology indicators and hash tags to the message that improve their future searchability and forwarding to interested persons associated with the work project.

The database for the system 410 will also contain lists of groups of persons who should receive the harvested messages by subject. The automated processing functionality can use these group lists to automatically forward the harvested messages to persons having a need-to-know that information due to its subject. These group lists may also be used during the automated processing functionality to forward a question posed by a field worker to knowledge experts on the larger project team who can answer the question so that the field worker can perform his work task more confidently and efficiently at the project site.

The harvest messages sent by the field workers to the central hub via the knowledge management system will often be relatively short and confined to a single topic. Therefore, such a message as a discrete parcel may be automatically tagged during the processing by the knowledge management system, as described above to link the message to an individual or group of individuals. This enables the system to route the message to those individuals or make it accessible to those individuals upon request. Where, e.g., the harvested message sent from the project site states that a piece of equipment was installed in a different location than that set forth within the project plan documents, then the system will automatically tag the message to an individual who is responsible for updating the project plan documents to reflect the true installed location for that piece of equipment. If, e.g., the harvested message sent from the project site states that a task has been completed sooner than scheduled, or will be completed later than scheduled, then the message will be automatically tagged by the system to an individual who is responsible for updating the upcoming project assignments to reflect how the sequentially scheduled work tasks may need to be altered to accommodate the status of the task at the work site.

Figure 18:
FIG. 18 is an interface depicting a list of captured and sent sensor readings, according to one or more embodiments.

Referring back to the home screen 460 for the user's tablet computer or Smart phone device shown in FIG. 7, the download icon 4180 found on the bottom tool bar 4182 enables the user to access a comprehensive list of all the harvests that the user has previously sent to the centralized hub 440, as shown on the GUI screen 4184 in FIG. 18. A plurality of historical sent harvests 4186, 4188, 4190, 4192, etc. are shown on the GUI screen with the most-recently-sent harvest 4186 positioned at the top.

Figure 19:
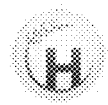
FIG. 19 is a detailed account of a sensor reading, according to one or more embodiments.

If the user selects this most-recently-submitted harvest 4186 on GUI screen 4184, then the full content of the harvest message is represented on GUI screen 4200 as shown in FIG. 19. Note that the centralized hub 440 curation functions (whether carried out by a human staff member or automated software rules and algorithms) has reformatted the user's submitted harvest message to make it more complete and intelligible to the recipients. For example, "Fridley Community Center" has been added as the project name to the harvest message, and Brett Grendahl has been added to the harvest message as the sender. This allows the user to not only review his previously submitted harvest messages, complete with any attached photographs, videos, and voice-to-text context, but also to inspect precisely what the recipients received and saw. The "backwards" icon 4194 appearing in the tool bar 4182 allows the user to go back to the "submitted harvests" list of GUI screen 4184 from an individual harvest message of GUI screen 4200, or from the submitted Harvests list screen 4194 back to the home screen 460 of FIG. 7.

Any harvest messages forwarded to the user by the centralized hub 440 of the knowledge management system 410 can be readily accessed via the "mailbox" icon 4210 appearing on the tool bar 4182 of the home screen 460 shown in FIG. 7. Note that these harvested messages can be forwarded to the user's message inbox either because the sender of that message chose the user as a direct recipient, or because the centralized hub 40 selected the user as a recipient during the message curation step 444.

Figure 20:
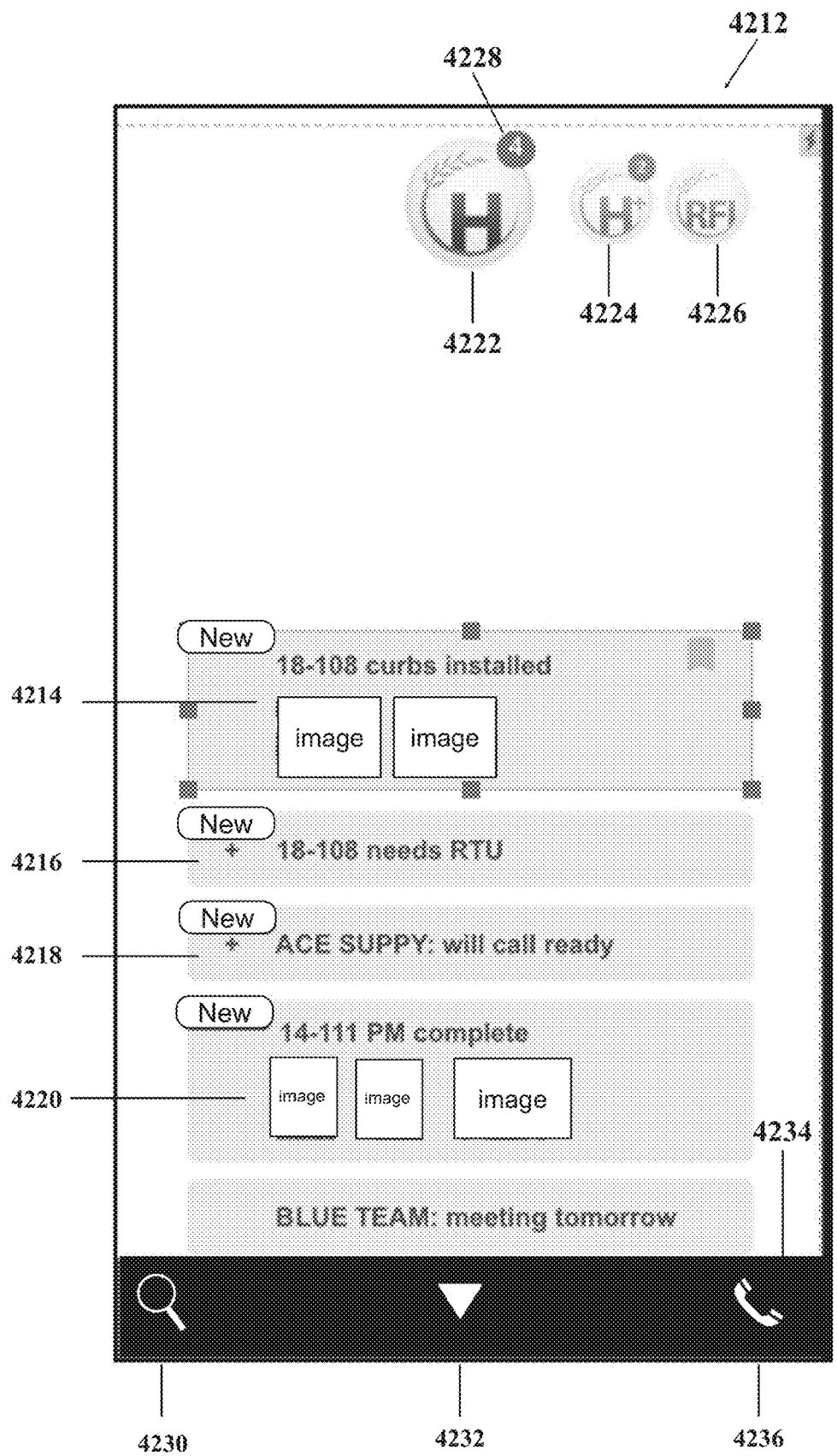
FIG. 20 is an interface depicting a list of captured and audited sensor readings, according to one or more embodiments.

As depicted in FIG. 20, the harvest messages inbox appears on GUI screen 4212. A plurality of incoming messages 4214, 4216, 4218, 4220, etc. are shown with the most-recently-received harvest message 4214 on top of the inbox screen 4212. Note that the "Harvest H" icon 4222 is larger than the "H+" harvest+action icon 4224 and "RFI" request for information icon 4226 on the top of the screen to show the user that this is the summary list for the harvest messages inbox. The Number "4" shown adjacent to the "Harvest H" icon 4222 also informs the user that he has received four new and unread incoming harvest messages.

This is a dynamic inbox. The incoming messages may have been directed to the user as a direct target by the sender of that harvest message, or by the curation step applied to that harvest message by the human or automated centralized hub function 440. Moreover, all harvested messages for a particular project or building may have been forwarded to the user by the centralized hub in response to the profile set up by that user for incoming harvested messages to be received. Furthermore, the user can click on a particular sender's harvest messages, so that all of their submitted harvest messages are sent to the user. Thus, the user can make sure that he is receiving all of the relevant harvest messages for a particular project or equipment installation for a project, so that the information is shared on a need-to-know basis to promote project efficiencies.

Figure 21:
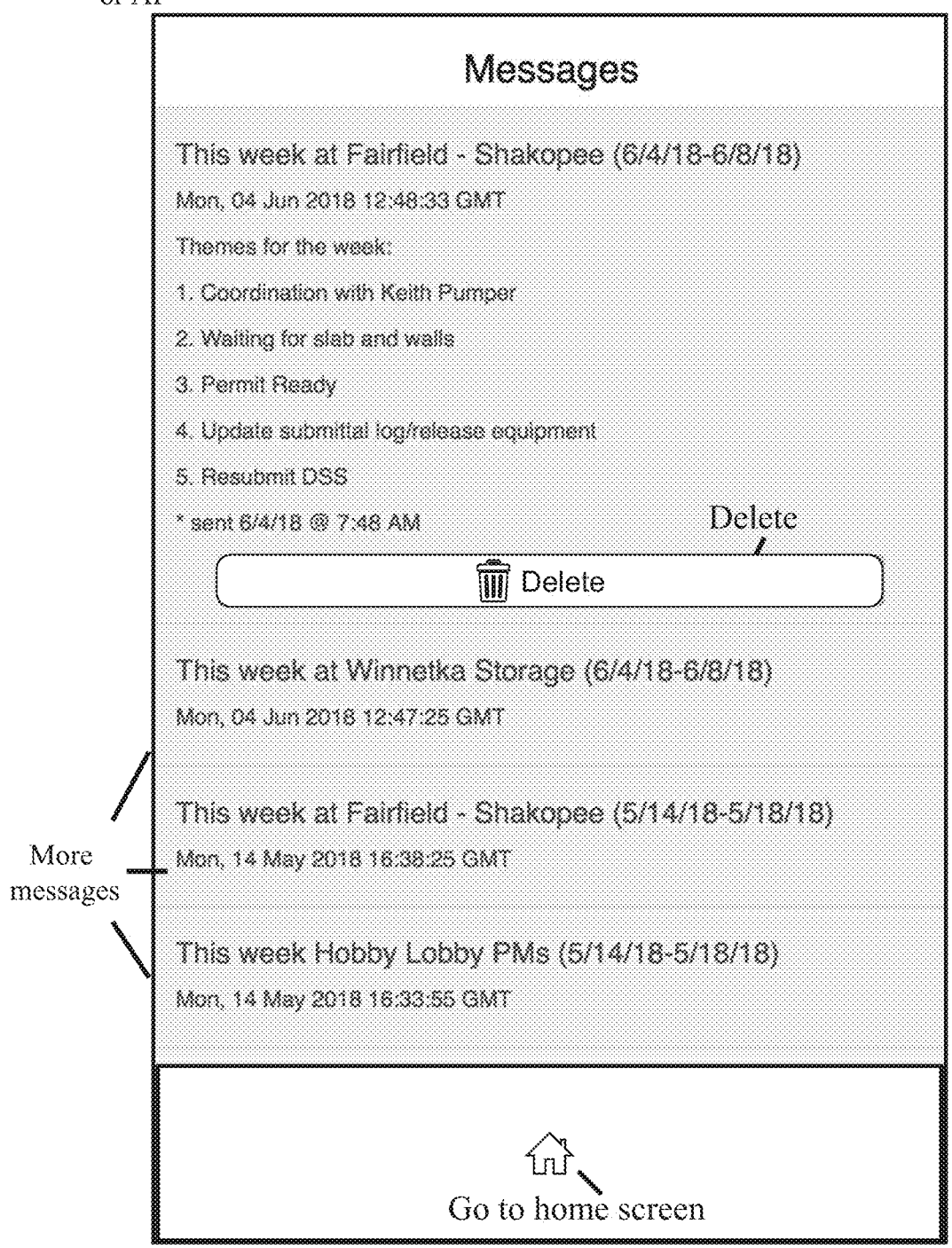
FIG. 21 is a detailed account of a sensor reading, according to one or more embodiments.

By selecting a particular harvest message like harvest message 4214 listed in the messages inbox 4212, the complete message with its photographic and text content is provided in GUI screen 4240 shown in FIG. 21. This represents the complete harvested message after it has been curated by the centralized hub 440. The "back" icon 4242 takes the user back to the inbox screen 4212 of FIG. 20.

Located on task bar 4234 of harvest messages inbox screen 4212 of FIG. 20 is a magnifying glass icon 4230. Selection of this icon will allow the user to obtain a keyboard to type in a search request for a particular received harvest message. This is useful if the user has received or retained a substantial number of incoming harvest messages. Many users choose to keep all or most all of their received harvest messages on their tablet computer or Smart phone device in order to keep a portable record of information to assist them with the project. By typing in a specific search request, the user will be taken directly to the message or messages corresponding tot that search request.

Meanwhile, the "funnel" icon 4232 appearing on tool bar 4234 enables the user to set up a filter for harvest messages corresponding to particular projects, content, people, key words, etc. In this manner, the user can quickly find desired incoming harvest messages without having to scroll through each one on the inbox screen 4212 of FIG. 20. Finally, the telephone icon 4236 appearing on the tool bar 4234 of the inbox screen 4212 of FIG. 20 allows the user to call a human or artificial intelligence operator back at the centralized hub 440. The user can then provide a search request to the operator for desired messages or data.

Referring back to FIG. 7, the Harvest+Action icon 4250 located on the home screen enables the field worker to note in his information harvest message sent to the central hub that a particular follow-up action needs to occur. The successive GUI screens for the field worker to send a harvest message accompanied by a required follow-up action item will be similar in content and structure to those depicted in FIGS. 8-21 and described above with the exception that there is a special additional field that enables the field worker to specifically describe the required follow-up action item, its timing, who needs to be tasked or notified, etc. By sending this harvest message with a required follow-up action item to the central hub via the Harvest+Action icon 4250, the message, itself, will be specially tagged for prompt follow up by the personnel or automated processing functionality of the central hub. In this manner, these important harvest messages sent from the project site that require follow-up action by others will not be lost amongst the large number of other harvest messages sent via the Harvest History icon 462.

The home screen 4212 of FIG. 7 also contains a "RFI" request for information icon 4260. This represents a critical functionality for the knowledge management system 410 of the present invention. A field worker at the project site may encounter a problem for which he needs assistance from other persons on the design or construction team. For example, the incorrect piece of equipment may be on site for an installation task, the actual project may have deviated from what was provided in the design documentation, or the user may be unfamiliar with all needed aspects for the task at hand.

Figure 22:
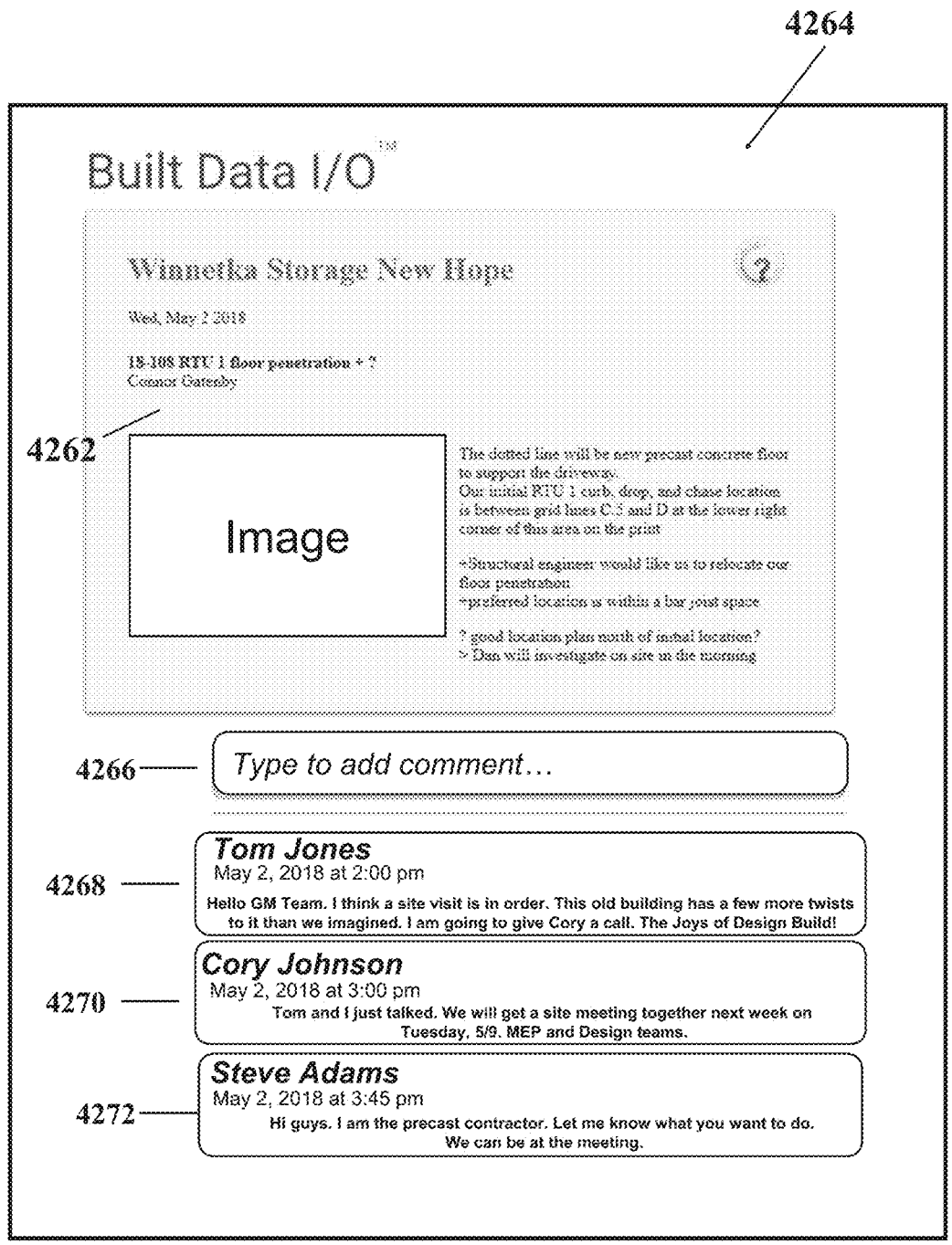
FIG. 22 is a query and response interface that may be used where a worker has labeled a sensor reading as a query or a question, according to one or more embodiments.

By selecting the "RFI" icon 4260, a series of GUI screens will be provided by the system software that allows the user to create a request for information message 4262 like the message shown on GUI screen 4264 in FIG. 22. In this case, the structural engineer for a construction project has asked Connor Gatenby to relocate the floor penetration for the new precast concrete floor needed to support a driveway to a different location than what was depicted by the designers in the diagram attached to the RFI message 262. Connor Gatenby is asking whether there is a good location for the new precast concrete floor and driveway north of its designed location, and states that "Dan will investigate on site in the morning."

Once this RFI message 4262 is submitted by Connor Gatenby to the centralized hub 40 of the knowledge management system 410, the human or automated curator will identify the relevant experts for the question and forward the RFI message to their inboxes on their computer or Smart phone devices. An input field 4266 within the GUI screen 4264 of FIG. 22 provides a keyboard to allow any of the recipients along with Connor Gatenby to create a dialog in response to the request for information. These comments by the various individuals are reproduced as responses 4268, 4270, and 4272 below the typed input field 4266. In this manner, this small group of individuals with expertise or decision-making authority for the question asked by Connor Gatenby can discuss the issue and come to a quick resolution, so that Connor Gatenby as the field worker at the work site can resume the installation task with minimal delay. Otherwise, the installation might need to be placed on hold for days until the group could get together to discuss the issue and make a decision.

The following examples further illustrate the system 410 of the present invention:

Example I—Harvest History

Brandon is an HVAC Journeyman working on a commercial construction project of a new TJ Maxx. It is a tenant improvement renovation of a space formerly occupied by Home Depot.

During the first day on the project, he walks the roof to assess what existing HVAC rooftop equipment exists. There are no original construction drawings or documents available to the current construction team.

While walking the roof, Brandon stops at each RTU (rooftop unit) and, using the Built Data I/O software on his mobile device, selects the "Harvest History" action to take photos of each RTU's nameplate that shows the make, model and serial number along with other pertinent technical data.

Upon sharing his harvest, this information is immediately transmitted to the Built Data Operator department where it is reviewed and forwarded (manually and/or algorithmically) to other project team members, inside his company and/or outside of it, who need this information for their job function.

In addition, this information is now archived where it can be readily accessed if and when needed in the future.

Example II—Harvest History

A few days later in the project, Brandon has a conversation with the electrical and framing contractor's foreman regarding what the planned ceiling height will be in the new space. They coordinate and agree as to where each trade will hang their equipment and/or material so as to leave appropriate physical space for each other's work.

Brandon selects "Harvest History" to capture these details. By sharing these details they can be transmitted to all relevant project parties and made available for reference should future questions arise. In addition, should new workers from each each contractor's organizations be deployed to this project the information on what was agreed upon can be made known, quickly and to all.

Example III—Harvest+Action

While on site and learning of what work his company can get underway, Brandon realizes that his team will need a scissor lift right away so that they can get moving on installation of ductwork to be hung at 15 foot heights from 20 foot roof bar joists.

Brandon chooses "Harvest+Action" on his Built Data I/O app to identify this need and action item. Upon sharing his need, the Built Data Operator department flags this open action item and routes the need to the project management staff.

Example IV—Need An Answer

As Brandon is organizing the work to be done on this project and begins to produce ductwork fabrication orders for the fabrication shop he realizes that the drawings indicated that all RTU roof curbs will require burglar bars. As he does not know these technical dimensions he cannot continue in his work until he finds these details out.

Brandon chooses "Need An Answer" on his Built Data I/O app to request this information. Upon sharing this question and need he can continue with his work day, choosing another of the many tasks to do.

Once shared, the Built Data Operator department sees this incoming question and flags it as an open action item. This question is immediately shared with the project management team. Whomever on that team that is available can respond to Brandon's question, providing the details and/or informing him of the timetable to obtain an answer.

Brandon can continue the highest level of his role, pushing forward progress at the job site, leaving the information searching and retrieval to his support team.

Example V—Need An Answer

During the demolition phase of the project Brandon is wondering what to do with the existing RTUs on the neighboring tenant space that the General Contractor's Foreman mentioned will be remodeled for some new tenants. As Brandon's crew is now on site daily the timing is opportune for the to work on this possible future task.

Brandon selects "Need An Answer" on his Built Data I/O app to harvest pictures of the RTUs, pictures of their nameplates, a photo of the drawing of the roof noting the locations of these RTUs and comments about their physical condition and working order.

The Built Data Operator department immediately can route this information to all interrelated, yet independent organizations (GC, engineer, architect, tenant and property owner). Furthermore, by creating The Same Page for this particular question the dialogue between these parties can be handled and captured in a neutral, online webpage designed solely for the efficient handling of this urgent question.

Once all parties have come to agreement and the ultimate decision-maker has determined the path of action Brandon receives an update with that plan, continues on his productive path and the "why" behind what happened is preserved in the Built Data I/O archives.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the disclosure to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:
1. A method for an automated construction site visual audit log that converts raw construction site data to a useable format and immediately presents it to relevant persons on a construction project, the method comprising:

receiving a raw data package originating at a device at a construction site of a construction project, the data package including:
  a sensor reading of a portion of a construction site relevant to a construction trade, the sensor reading generated by a sensor that is part of a device manipulated by a person performing construction tasks pursuant to the construction trade at the construction site, the senor measuring photons to produce the sensor reading, the sensor reading representing a construction audit event at the construction site that is relevant to a construction team for ongoing tracking, managing, or chronologizing of the construction project;
  a set of automatically generated sensor metadata that corresponds to the sensor reading and includes:
    a time the sensor reading was captured; and
    a geographic location the sensor reading was captured; and
  a set of user-generated metadata input into the device by the user including a dialogue providing project relevant context to the construction audit event;
storing the sensor reading in an audit event entry of a data warehouse;
performing a curation operation to convert the raw data package into a useable format by creating augmented metadata that changes, deletes, or supplements aspects of the set of user-generated metadata including adding identifications of relevant persons on the construction project;
storing the augmented metadata and the automatically generated sensor metadata as a set of audit metadata;
updating a multi-faceted index of the data warehouse making the audit event entry and the associated audit metadata immediately available to the relevant persons on the construction project, the updating comprising taking steps to:
  link the set of audit metadata to the audit event entry;
constructing a user interface for construction audit events, including the audit event entry, in the data warehouse, the user interface including a visual representation of sensor readings organized by the multifaceted index, the user interface including user interface elements for one or more facet controls to accept user input to select the inclusion, order, or magnitude of facets to modify the visual representation of sensor readings by sorting a series of audit event entries corresponding to the construction audit events through the multi-faceted index using the user input; and
automatically serving the user interface to the relevant persons over a wide area network enabling the user to visually experience the construction audit events.

2. The method of claim 1, further comprising displaying, without user prompting, a visual representation of the sensor reading to provide a real-time feed.

3. The method of claim 2, wherein the visual representation of the sensor reading is a thumbnail image and selection of the thumbnail image generates a detailed account of the sensor reading and the set of sensor metadata.

4. The method of claim 1, wherein the data warehouse with multi-faceted index is a hyperindex visual chronicle of the construction project.

5. The method of claim 1, further comprising executing software on the device that, when operating:
controls the sensor to capture the sensor reading;
triggers the generation of the sensor metadata;
creates the data package; and
controls a transmitter to transmit the data package.

6. The method of claim 5, wherein the software, when operating, provides an interface for capturing the set of user-generated metadata from the person, the method further comprising inputting, by the person, the set of user-generated metadata.

7. The method of claim 1, further comprising:
comparing the sensor reading or the sensor metadata to a policy ruleset to determine whether the sensor reading or the sensor metadata violates the policy ruleset; and
storing the sensor reading in the audit event entry of the data warehouse in response to a determination that the sensor reading or the sensor metadata does not violate the policy ruleset.

8. The method of claim 1, wherein a member of the set of audit metadata is generated by a machine learning engine.

9. The method of claim 8, wherein the member of the set of audit metadata generated by the machine learning engine is an inference based on a new set of sensor metadata and a plurality of stored sets of audit metadata.

10. The method of claim 9, further comprising producing an inference result of the machine learning engine and presenting the inference result to the user.

11. The method of claim 1, wherein performing a curation operation comprises adding a classification of an item discernable from the sensor reading or the automatically generated sensor metadata and the classification comprises chronologize.

12. The method of claim 1, wherein performing a curation operation comprises adding a classification of an item discernable from the sensor reading or the automatically generated sensor metadata and the classification comprises performance.

13. The method of claim 1, wherein performing a curation operation comprises adding a classification of an item discernable from the sensor reading or the automatically generated sensor metadata and the classification comprises a query.

14. The method of claim 1, wherein performing a curation operation comprises adding a classification of an item discernable from the sensor reading or the automatically generated sensor metadata and the classification comprises a keyword.

15. The method of claim 1, further comprising aggregating a plurality of audit entries and serving the plurality of audit entries to a plurality of persons.

16. The method of claim 1, wherein aggregating is based on a common item of metadata across the plurality of audit entries.

17. A computer readable storage medium having instructions store thereon when operated by processor perform a method for an automated construction site visual audit log that converts raw construction site data to a useable format and immediately presents it to relevant persons on a construction project, the method comprising:
receiving a raw data package originating at a device at a construction site of a construction project, the data package including:
  a sensor reading of a portion of a construction site relevant to a construction trade, the sensor reading generated by a sensor that is part of a device manipulated by a person performing construction tasks pursuant to the construction trade at the construction site, the senor measuring photons to produce the sensor reading, the sensor reading representing a construction audit event at the construction site that is relevant to a construction team for ongoing tracking, managing, or chronologizing of the construction project; and a set of automatically generated sensor metadata that corresponds to the sensor reading and includes:
a time the sensor reading was captured; and
a geographic location the sensor reading was captured; and a set of user-generated metadata input into the device by the user including a dialogue providing project relevant context to the construction audit event;

storing the sensor reading in an audit event entry of a data warehouse;

performing a curation operation to convert the raw data package into a useable format by creating augmented metadata that changes, deletes, or supplements aspects of the user-generated metadata including adding identifications of relevant persons on the construction project;

storing the augmented metadata and the automatically generated sensor metadata as a set of audit metadata;

updating a multi-faceted index of the data warehouse making the audit event entry and the associated audit metadata immediately available to the relevant persons on the construction project, the updating comprising taking steps to:
link the set of audit metadata to the audit event entry;

constructing a user interface for construction audit events, including the audit event entry, in the data warehouse, the user interface including a visual representation of sensor readings organized by the multifaceted index, the user interface including user interface elements for one or more facet controls to accept user input to select the inclusion, order, or magnitude of facets to modify the visual representation of sensor readings by sorting a series of audit event entries corresponding to the construction audit events through the multi-faceted index using the user input; and automatically serving the user interface to the relevant persons over a wide area network enabling the user to visually experience the construction audit events.

18. The computer readable storage medium of claim 17, wherein the data warehouse with multi-faceted index is a hyperindex visual chronicle of the construction project.

19. The computer readable storage medium of claim 17, wherein the method further comprises executing software on the device that, when operating:
controls the sensor to capture the sensor reading;
triggers the generation of the sensor metadata;
creates the data package; and
controls a transmitter to transmit the data package.

20. The computer readable storage medium of claim 17, wherein the software, when operating, provides an interface for capturing the set of user-generated metadata from the person, the method further comprising inputting, by the person, the set of user-generated metadata.

\* \* \* \* \*